(12) United States Patent
Watanabe et al.

(10) Patent No.: US 8,000,202 B2
(45) Date of Patent: Aug. 16, 2011

(54) APPARATUS FOR RECORDING/REPRODUCING INFORMATION ON/FROM AN OPTICAL DISC HAVING FOCUS CONTROL CAPABILITIES

(75) Inventors: Katsuya Watanabe, Nara (JP); Shinichi Yamada, Osaka (JP); Kenji Fujiune, Osaka (JP); Yuichi Kuze, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/241,239

(22) Filed: Sep. 30, 2008

(65) Prior Publication Data
US 2009/0028028 A1 Jan. 29, 2009

Related U.S. Application Data

(62) Division of application No. 10/474,670, filed as application No. PCT/JP02/03406 on Apr. 4, 2002, now abandoned.

(30) Foreign Application Priority Data

Apr. 17, 2001 (JP) .................................. 2001-117843

(51) Int. Cl.
*G11B 7/00* (2006.01)
(52) U.S. Cl. ...................................... 369/94; 369/275.3
(58) Field of Classification Search .................... 369/94, 369/275.3
See application file for complete search history.

(56) References Cited

U.S. PATENT DOCUMENTS

| | | | |
|---|---|---|---|
| 5,526,336 A | 6/1996 | Park et al. | |
| 5,729,525 A | 3/1998 | Ishida et al. | |
| 5,793,721 A * | 8/1998 | Akkermans | ................ 369/44.27 |
| 5,802,174 A | 9/1998 | Sako et al. | |
| 5,881,032 A | 3/1999 | Ito et al. | |
| 6,002,655 A | 12/1999 | Ono et al. | |
| 6,370,091 B1 * | 4/2002 | Kuroda | ...................... 369/30.08 |
| 6,424,614 B1 | 7/2002 | Kawamura et al. | |
| 6,728,174 B1 | 4/2004 | Sako et al. | |

(Continued)

FOREIGN PATENT DOCUMENTS

CN 1164917 A 11/1997

(Continued)

OTHER PUBLICATIONS

Korean Office Action for corresponding Application No. 10-2008-7016888 dated Mar. 16, 2009 and English translation thereof.

(Continued)

*Primary Examiner* — Latanya Bibbins
(74) *Attorney, Agent, or Firm* — Renner, Otto, Boisselle & Sklar, LLP

(57) ABSTRACT

The present invention provides a method for recording/reproducing information on/from an optical disc, wherein the optical disc has a first to an n-th recording layers (n is an integer of 2 or greater) laminated on a substrate, each of the first to the n-th layers having data regions segmented into a first to an m-th data zone groups (m is an integer of 2 or greater) along a radial direction of the optical disc, each of the first to the m-th data zone groups including at least one data zone, the method comprising the steps of: a) recording/reproducing information in/from data zone groups from a j-th data zone group of a first recording layer to a j-th data zone group of an n-th recording layer; and b) repeating step a) for j=1, 2, ..., m.

2 Claims, 20 Drawing Sheets

U.S. PATENT DOCUMENTS

| | | |
|---|---|---|
| 6,801,494 B2 | 10/2004 | Ross |
| 6,853,613 B1 | 2/2005 | Sako et al. |
| 6,906,988 B1 | 6/2005 | Furukawa et al. |
| 6,977,880 B2 | 12/2005 | Tomita |
| 7,106,687 B1 | 9/2006 | Richter et al. |

FOREIGN PATENT DOCUMENTS

| | | |
|---|---|---|
| CN | 1204837 A | 1/1999 |
| EP | 001098303 | 5/2001 |
| JP | 07-110956 | 4/1995 |
| JP | 07-249239 | 9/1995 |
| JP | 09-138950 | 5/1997 |
| JP | 09-231576 | 9/1997 |
| JP | 9-265632 | 10/1997 |
| JP | 10-233019 | 9/1998 |
| JP | 2000-353319 | 12/2000 |
| JP | 2001-189049 | 7/2001 |
| KR | 10-0200837 | 6/1999 |
| KR | 10-0580769 | 5/2006 |
| WO | 97/05606 | 2/1997 |
| WO | 01/13359 A1 | 2/2001 |

OTHER PUBLICATIONS

Japanese Office Action for corresponding Application No. 2002-584306 dated Dec. 12, 2007.

Chinese Office Action for corresponding Application No. 02812044.2 dated Mar. 18, 2005.

Korean Office Action for corresponding Application No. 10-2008-7016888 dated Oct. 9, 2008 and English translation thereof.

Japanese Office Action for corresponding Japanese Application No. 2009-183881 dated Apr. 13, 2011.

* cited by examiner

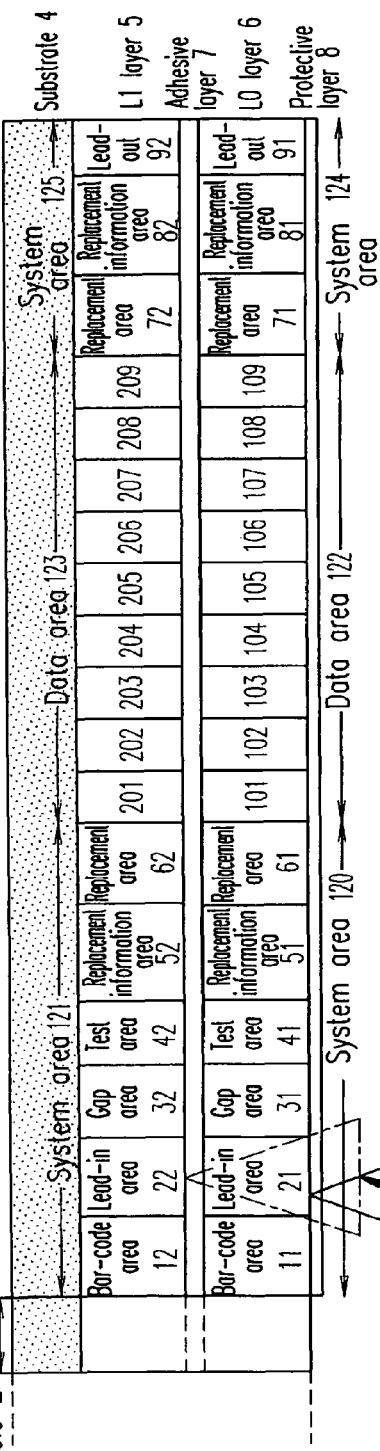
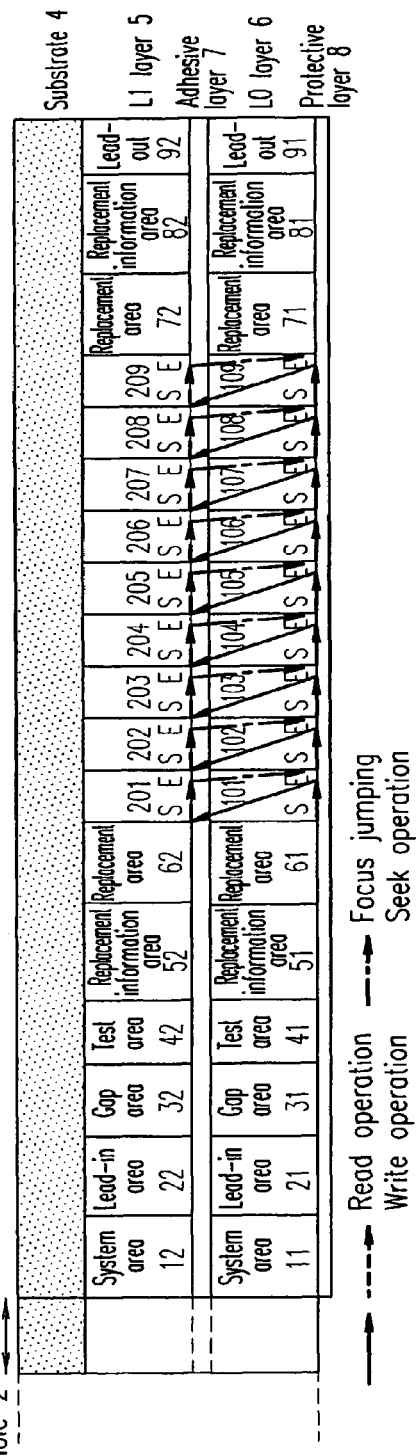
FIG. 2

FIG. 7
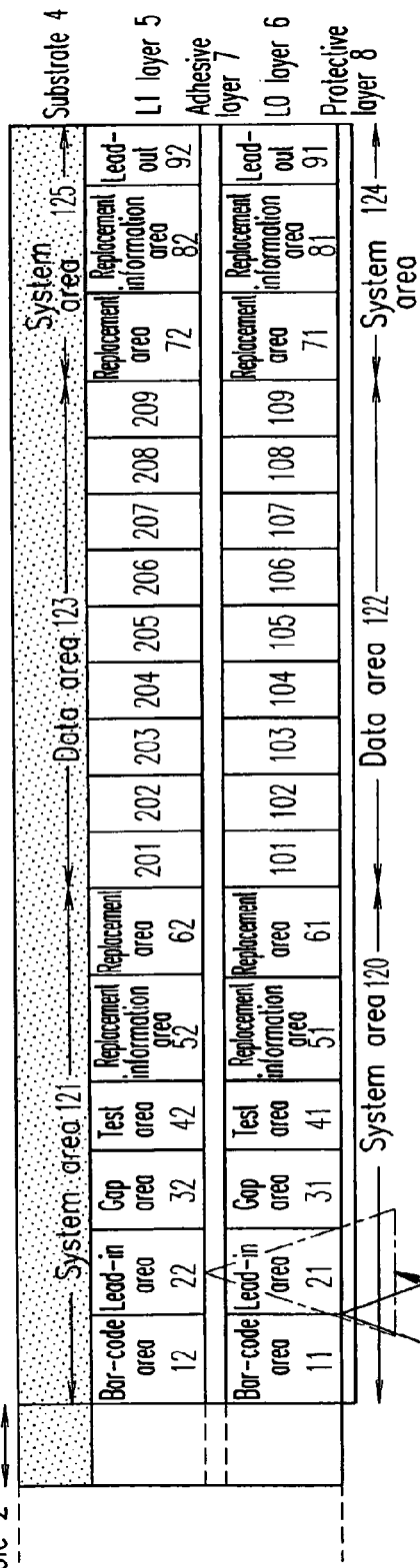
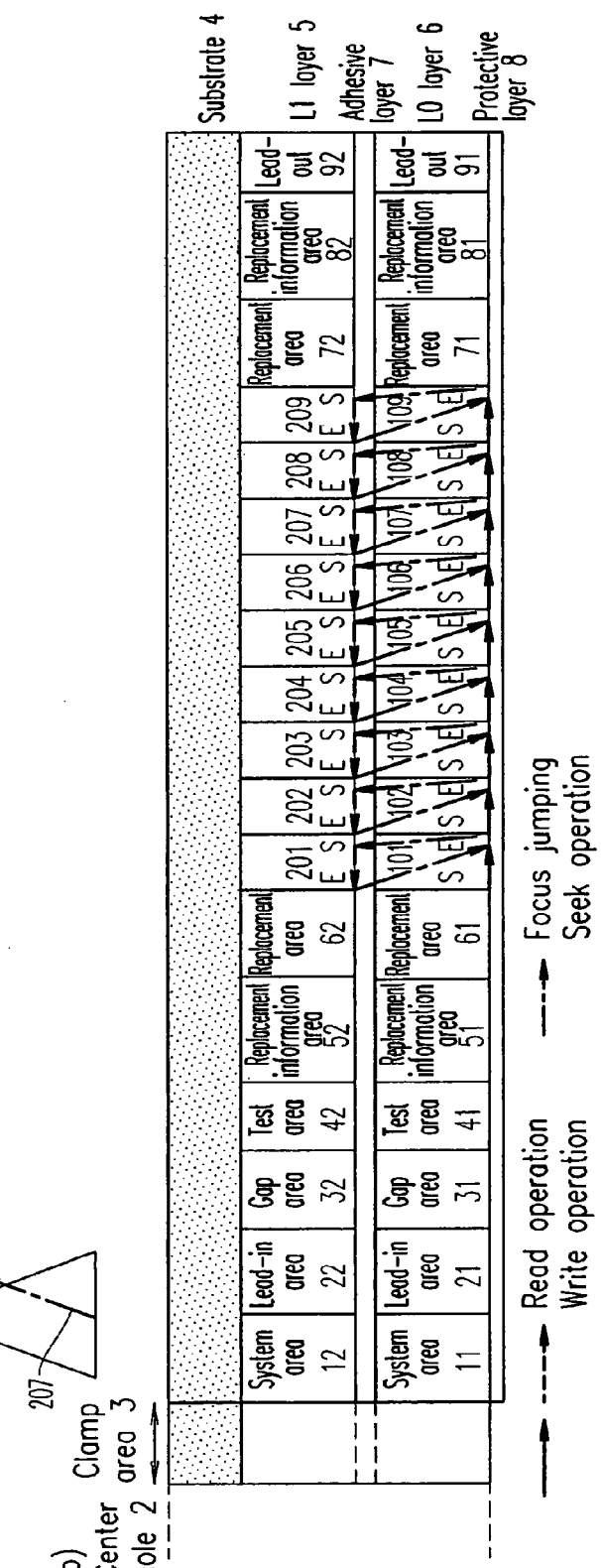

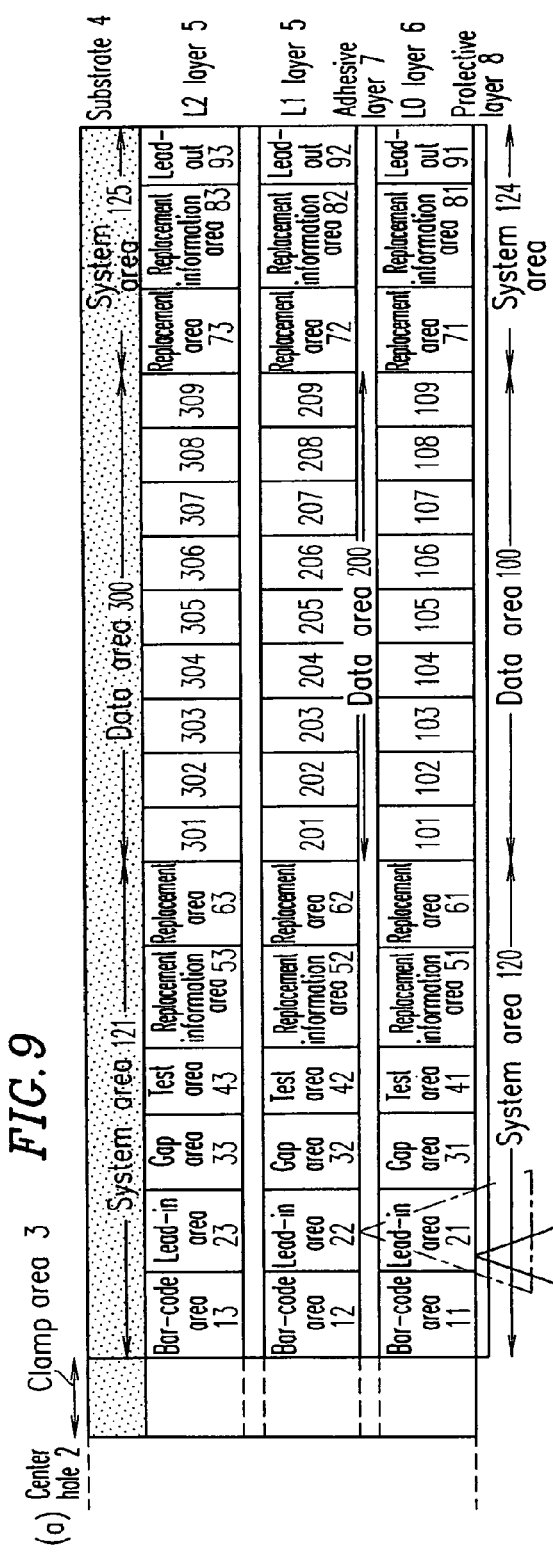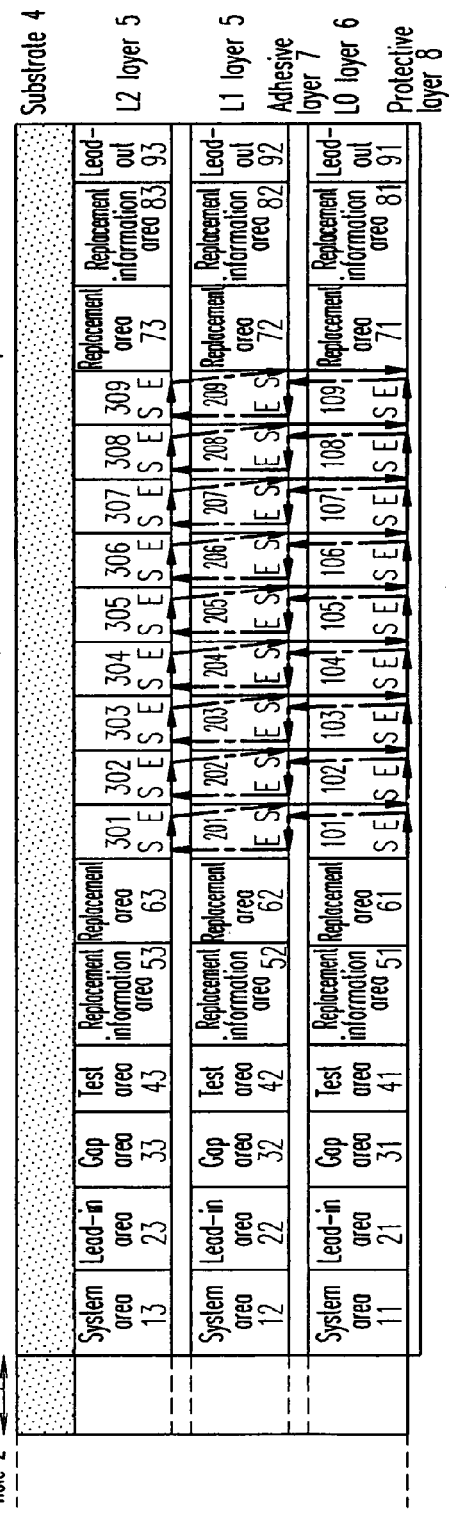
FIG. 9

FIG. 12
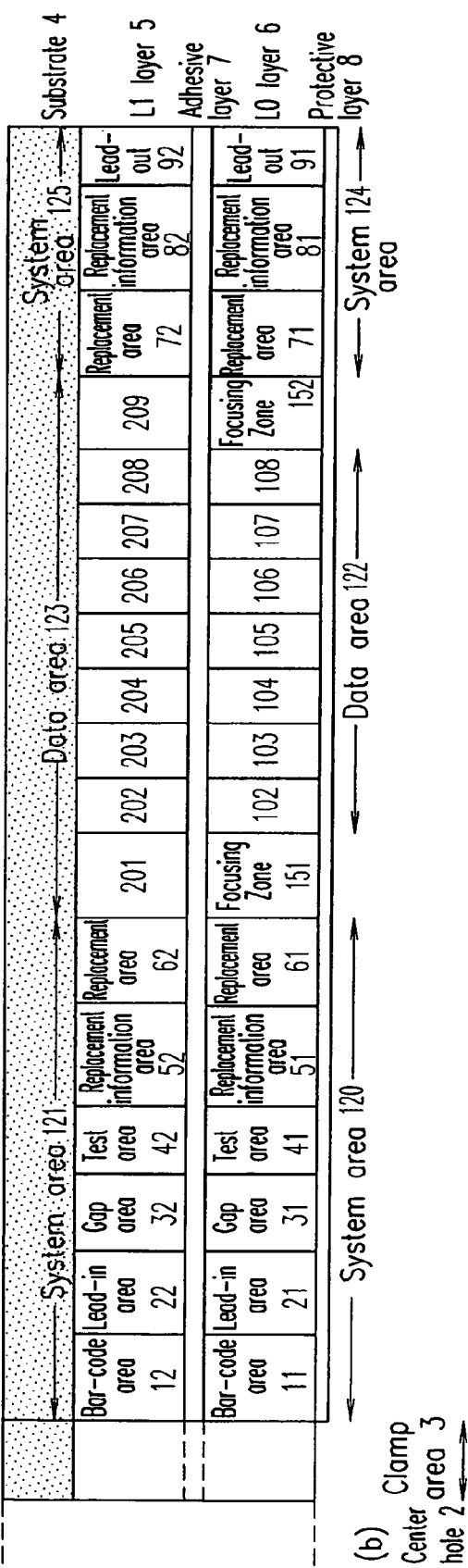
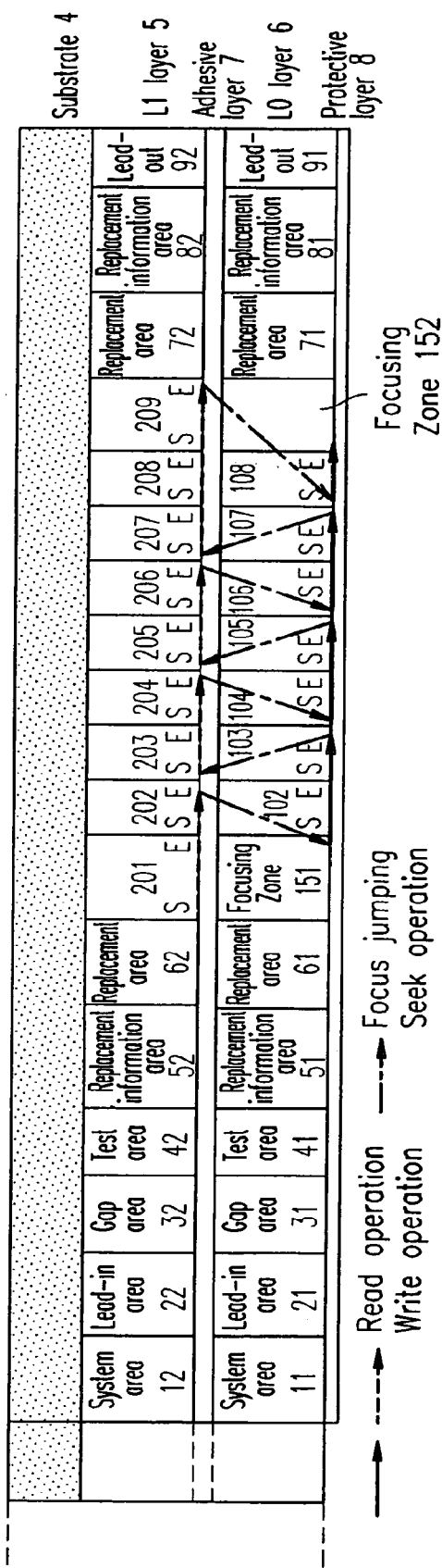

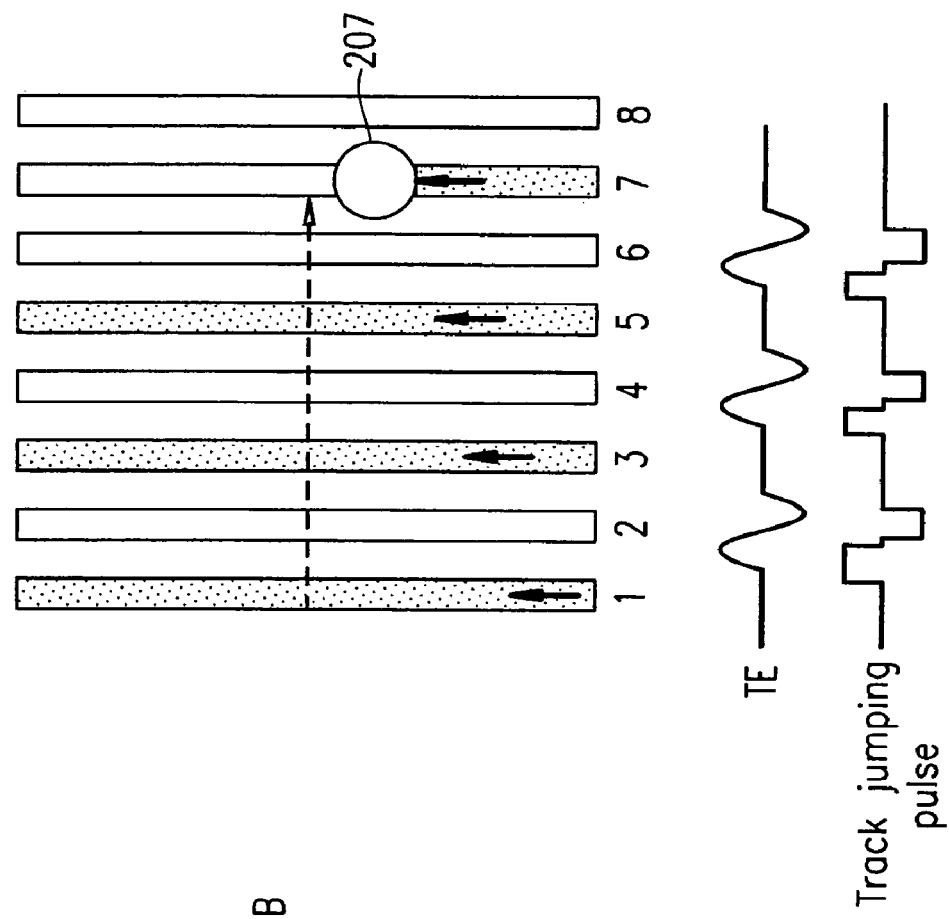
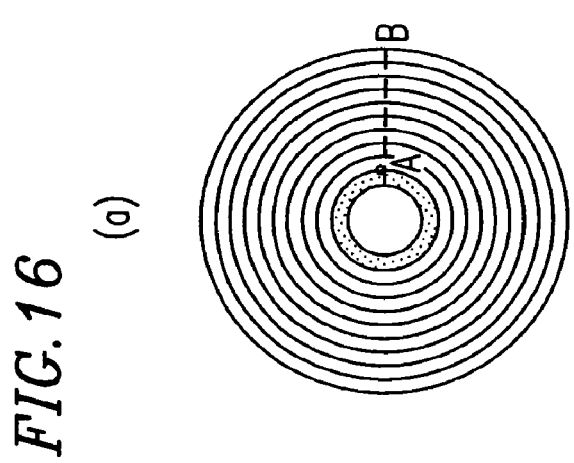
FIG. 16

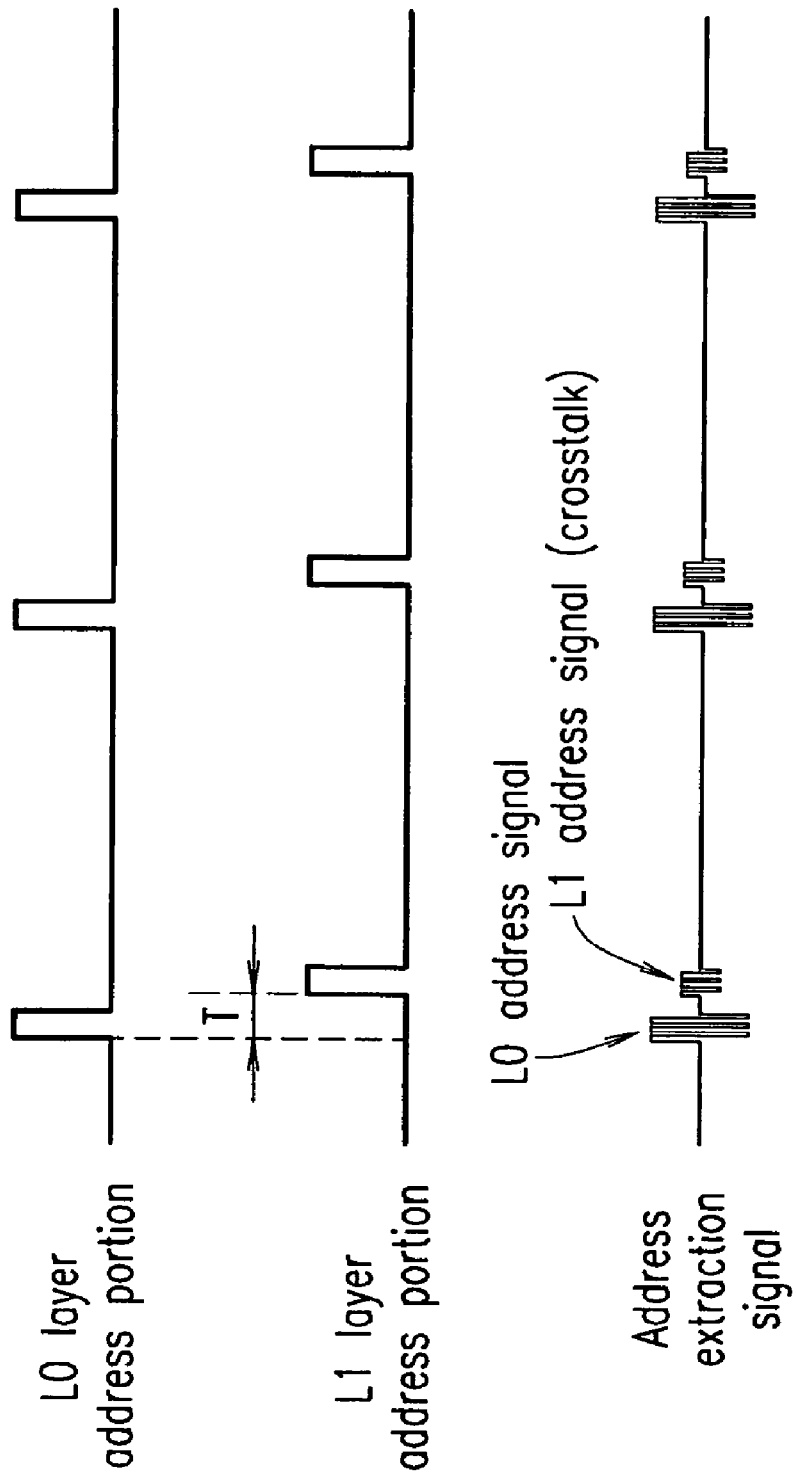

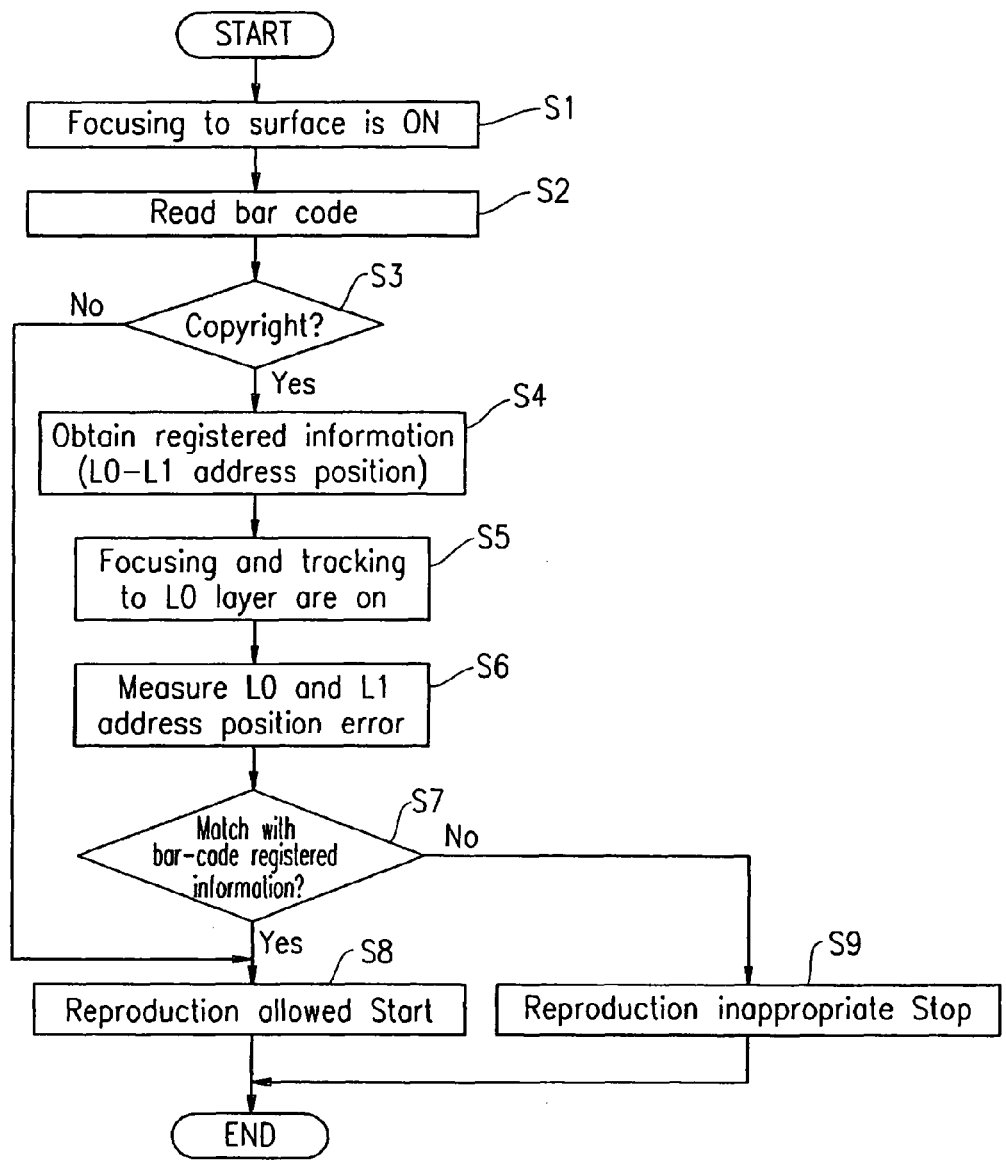

APPARATUS FOR RECORDING/REPRODUCING INFORMATION ON/FROM AN OPTICAL DISC HAVING FOCUS CONTROL CAPABILITIES

This application is a divisional of U.S. patent application Ser. No. 10/474,670 filed Oct. 14, 2003 now abandoned, which is a §371 of International Application No. PCT/JP02/03406 filed Apr. 4, 2002, the entire disclosures of which are incorporated herein by reference.

TECHNICAL FIELD

The present invention relates to an optical information recording/reproducing information medium formed by laminating recording layers, and an information recording/reproducing method and an information recording/reproducing apparatus using the same. More specifically, the present invention relates to an optical disc for optically recording/reproducing information, by using a light source such as a laser, on/from a recording surface formed by laminating recording layers, and an information recording/reproducing method and an information recording/reproducing apparatus using the same.

BACKGROUND ART

Typical conventional optical discs include CDs, DVDs, and the like. Among others, a DVD-RAM, i.e., a rewritable optical disc, includes a bar-code area (BCA) having a form of a bar code for recording copyright protection information or a serial number on an innermost periphery, a control track (LEAD-IN area) adjacent to the BCA which is pre-cut with a concave-convex emboss, a gap area adjacent to the LEAD-IN area which is formed by a mirror portion formed all the way around, and data tracks adjacent to the gap area which have a continuous trench-like structure called lands and grooves. The data tracks are separated along a peripheral direction into regions of every predetermined block, which are called sectors, with preformatted address portions having zigzag mark (pit) forms.

For compatible recording capacity and performance, the rate of an optical disc is changed in a predetermined length of the diameter. Herein, in order to achieve a substantially constant linear velocity of an optical disc during driving, the optical disc is divided into 35 regions (24 regions in Ver. 1.0) which are called zones along the radial direction. On the innermost periphery of the data track of the optical disc, a TEST zone for learning a recording power or the like of the laser in accordance with the optical disc is provided. Adjacent to the data tracks of innermost periphery and the outermost periphery, DMAs (Disk Management Areas) for managing defects are provided.

For actually recording information on a DVD-RAM disc, an optical beam is moved to the emboss region to read control data and to collect required data related to the disc or recording conditions and so on. The recording power of the laser or the like is learnt in the TEST zone. Then, information of the inner and the outer DMAs are read and the information is updated for preparation. Basically, when a predetermined request for writing data is issued, recording is performed sequentially from an inner data track. Every time an optical beam crosses a border of the zones, the rate is reduced to maintain the linear velocity constant while the recording is performed.

Regarding a read-only DVD-ROM, a double-layer disc, in which an information surface having a pit shape is provided on a substrate having a thickness of 0.6 mm is standarilized and two such substrates are attached to each other in the same direction, allowing information to be read from one side without reversing the disc. The layout of the DVD-ROM disc is basically the same as that of the DVD-RAM. Similar to the DVD-RAM described above, a DVD-ROM has a BCA having a bar code shape in which copyright protection information and a serial number are recorded on the innermost periphery of the disc, and adjacent to the BCA, a control track (LEAD-IN) which has a pre-cut embossed shape. A data portion which has the same embossed shape is physically coupled to the control track.

A recording layer L0 is closer to a source of an optical beam (a light source) than a recording layer L1. An intermediate layer between the recording layer L0 and the recording layer L1 generally has a thickness of 40-70 μm. Movement between the layers is realized by focus jumping, i.e., switching off tracking control temporarily, releasing focus control, and applying a pulse having a rectangular wave shape to a focus actuator. In general, a direction for recording information on a disc is a direction from the inner periphery to the outer periphery of the disc for both the L0 and L1 (parallel paths). However, it may be a direction from the inner periphery to the outer periphery for the L0 and vice versa for the L1 (opposite paths). The opposite paths allow the shortest focus jumping from L0 to L1 at the outer periphery of the disc even when a reproduction time of video data becomes long. Thus, seamless reproduction is possible.

However, regarding the above-mentioned recordable DVD-RAM disc, a double-layer disc or a multi-layer disc having two or more layers with information surfaces laminated does not exist. Conventional DVD-ROM double-layer discs include a parallel path type disc in which data is recorded in the same direction, from the inner periphery to the outer periphery, for both the L0 and L1, and an opposite path type disc in which data is recorded from the inner periphery to the outer periphery for the L0, and vice versa for the L1. If a multi-layer recordable disc is assumed based on this conventional technique, regarding a DVD-RAM disc, similar to a DVD-ROM double-layer disc, there may be a parallel path type structure in which recording surfaces are laminated in a simple manner with spiral directions thereof aligned, and an opposite path type structure in which recording surfaces are laminated with their spiral directions reversed.

In the case where a long-duration content is recorded on a parallel path type disc, when the recording is performed and reaches the outermost periphery of a recording layer closer to a light source (L0), an optical beam must go back to the innermost periphery of a recording layer further from the light source (L1). In addition to focus jump for moving between the L0 and L1, a seek of a full length stroke occurs. During the movement between the layers, data cannot be recorded and must be stored in a buffer memory. Thus, a large quantity of memory is required. However, when a large number of small-size files are recorded or reproduced at random, since they can be recorded closely to each other from the inner periphery. Thus, a latent time for motor rotation response becomes shorter every time the optical beam crosses borders between the zones. The reproduction performance is less effected by the motor response. In the case of the opposite path type disc, recording is performed until it reaches the outermost periphery of the L0 layer, and then it is resumed from the outermost periphery of the L1 layer. Thus, an ability to allow a random access is lower than that of the parallel path type disc in which recording is performed in the direction from the inner periphery to the outer periphery for both the L0 and L1.

The present invention is provided for solving the above-described problem. An objective of the present invention is to provide an optical disc which enables an efficient recording/reproduction regardless of a capacity of a file and allows both seamless data and a random access to data, and an information recording/reproducing method and information recording/reproduction apparatus using the same.

In order to improve a density (capacity) and further secure SN of a reproduction signal, generally, track pitches are made closer to each other and depths of grooves are made shallower. This results in reduction in an amplification of a push-pull tracking error signal. Further, due to an influence of light reflected off adjacent tracks having different reflectances while data is recorded, an offset is generated in a tracking error signal.

A conventional optical disc has a one-spiral structure. When data is continuously recorded in this track, recording proceeds sequentially from, for example, track 1 of the inner periphery, to adjacent tracks along the spiral. When the continuous recording is performed as such, relative to a current position of a beam spot performing recording, the inner adjacent track has been recorded and the outer adjacent track remains unrecorded. The inner and the outer adjacent tracks have different reflections. Conventionally, in a scheme where a track deviation is detected using intensities of first-order diffracted light at track groove portions, such as, a push-pull tracking, such an influence of a difference in reflectances between adjacent tracks have been small. As the density becomes higher and track pitches become smaller, a relative diameter of a spot of an optical beam with respect to a track on the disc becomes large. Thus, due to an influence caused by a difference in reflectances of adjacent tracks, an offset is generated in a tracking signal. The tracking tends to go off easily. Accordingly, a skip of sounds and a block noise may undesirably occur when the beginning of a music piece or video is being searched or when the reproduction thereof comes to an end.

The present invention is provided for solving the above-described second problem. An objective of the present invention is to provide an apparatus having a high reliability by recording information on every other track to reduce an influence caused by a difference in reflectances due to recorded/unrecorded states of adjacent tracks and implement a stable track control.

Another objective of the present invention is to implement a partial ROM disc more easily by locating a ROM region on the layer furthest from the light source to provide a high performance apparatus which is capable of record and reproduce with fast switching between a ROM region and a RAM region and implementing a fast-speed recording of additional data or recording a program different to the one being viewed.

DISCLOSURE OF THE INVENTION

The present invention provides a method for recording/reproducing information on/from an optical disc, wherein the optical disc has a first to an n-th recording layers (n is an integer of 2 or greater) laminated on a substrate, each of the first to the n-th recording layers having data regions segmented into a first to an m-th data zone groups (m is an integer of 2 or greater) along a radial direction of the optical disc, each of the first to the m-th data zone groups including at least one data zone, the method comprising the steps of: a) recording/reproducing information in/from data zone groups from a j-th data zone group of a first recording layer to a j-th data zone group of an n-th recording layer; and b) repeating step a) for j=1, 2, . . . , m, thereby achieving the above-described objectives.

One embodiment of the present invention is a method described above, wherein n=2, and each of the first to the m-th data zone groups includes a single data zone, the data zones being allocated with physical addresses incremented along a predetermined direction, in which the incremental direction of the physical addresses in the data zones of the first recording layer and the incremental direction of the physical addresses in the data zones of the second recording layer are the same.

One embodiment of the present invention is a method described above, wherein n=2, and each of the first to the m-th data zone groups includes a single data zone, the data zones being allocated with physical addresses incremented along a predetermined direction, in which the incremental direction of the physical addresses in the data zones of the first recording layer and the incremental direction of the physical addresses in the data zones of the second recording layer are opposite.

One embodiment of the present invention is a method described above, wherein n=3, and each of the first to the m-th data zone groups includes a single data zone, the data zones being allocated with physical addresses incremented along a predetermined direction, in which the incremental direction of the physical addresses in the data zones of the first recording layer, the incremental direction of the physical addresses in the data zones of the second recording layer, and the incremental direction of the physical addresses in the data zones of the third recording layer are the same.

One embodiment of the present invention is a method described above, wherein n=3, and each of the first to the m-th data zone groups includes a single data zone, the data zones being allocated with physical addresses incremented along a predetermined direction, in which the incremental direction of the physical addresses in the data zones of the first recording layer and the incremental direction of the physical addresses in the data zones of the third recording layer are the same, and the incremental direction of the physical addresses in the data zones of the first recording layer and the incremental direction of the physical addresses in the data zones of the second recording layer are opposite.

One embodiment of the present invention is a method described above, wherein n=4, and each of the first to the m-th data zone groups includes a single data zone, the data zones being allocated with physical addresses incremented along a predetermined direction, in which the incremental direction of the physical addresses in the data zones of the first recording layer and the incremental direction of the physical addresses in the data zones of the third recording layer are the same, the incremental direction of the physical addresses in the data zones of the second recording layer and the incremental direction of the physical addresses in the data zones of the fourth recording layer are the same, and the incremental direction of the physical addresses in the data zones of the first recording layer and the incremental direction of the physical addresses in the data zones of the second recording layer are opposite.

One embodiment of the present invention is a method described above, wherein n=2, and the data zones are allocated with physical addresses incremented along a predetermined direction, in which the incremental direction of the physical addresses in the data zones of the first recording layer and the incremental direction of the physical addresses in the data zones of the second recording layer are the same.

One embodiment of the present invention is a method described above, wherein n=2, and the data zones are allocated with physical addresses incremented along a predetermined direction, in which the incremental direction of the physical addresses in the data zones of the first recording layer and the incremental direction of the physical addresses in the data zones of the second recording layer are opposite.

One embodiment of the present invention is a method described above, wherein n=2, and each of the first to the m-th data zone groups includes a single data zone, the data zones being allocated with physical addresses incremented along a predetermined direction, in which the incremental direction of the physical addresses in the data zones of the first recording layer and the incremental direction of the physical addresses in the data zones of the second recording layer are the same, and a distance between the second recording layer and the substrate is larger than a distance between the first recording layer and the substrate.

One embodiment of the present invention is a method described above, wherein n=2, and each of the first to the m-th data zone groups includes a single data zone, the data zones being allocated with physical addresses incremented along a predetermined direction, in which the incremental direction of the physical addresses in the data zones of the first recording layer and the incremental direction of the physical addresses in the data zones of the second recording layer are opposite, and a distance between the second recording layer and the substrate is larger than a distance between the first recording layer and the substrate.

One embodiment of the present invention is a method described above, wherein control information is recorded on an optical disc surface, and the method further comprising the step of reading the control information, the information being recorded/reproduced based on the control information in the step (a).

The present invention provides an apparatus for recording/reproducing information on/from an optical disc, wherein the optical disc has a first to an n-th recording layers (n is an integer of 2 or greater) laminated on a substrate, each of the first to the n-th recording layers having data regions segmented into a first to an m-th data zone groups (m is an integer of 2 or greater) along a radial direction of the optical disc, each of the first to the m-th data zone groups including at least one data zone, the apparatus comprising: light receiving means for receiving an optical beam reflected off the optical disc; shift means for shifting a position of a focal point of the optical beam along a direction of lamination of the first to the n-th recording layers of the optical disc; and control means for performing focus control by controlling the shift means in accordance with the output from the light receiving means such that a distance between the focal point of the optical beam and a selected recording layer from the first to the n-th recording layers is within a predetermined error range, the control means releasing the focus control and controlling the shift means such that the focal point of the optical beam jumps from a j-th data zone group (j=1, 2, ..., m) of the selected recording layer to a j-th data zone group of the recording layer adjacent to the selected recording layer, thereby achieving the above-described objectives.

One embodiment of the present invention is a method described above, wherein the control means controls the shift means such that a distance between the focal point of the optical beam and a predetermined region in a predetermined recording layer of the first to the n-th recording layers is within a predetermined error range, and then controls the shift means such that the focal point of the optical beam jumps to an arbitrary data zone group of an arbitrary recording layer of the first to the n-th recording layers.

One embodiment of the present invention is a method described above, wherein the control means controls the shift means such that a distance between the focal point of the optical beam and a j-th data zone group in a selected recording layer from the first to the n-th recording layers is within a predetermined error range, and then controls the shift means such that the focal point of the optical beam jumps to a j-th data zone group of the recording layer adjacent to the selected recording layer from the first to the n-th recording layers.

One embodiment of the present invention is a method described above, wherein the control means controls the shift means such that the position of the focal point of the optical beam is corrected in accordance with an output from the light receiving means.

One embodiment of the present invention is a method described above, wherein one of the first to the n-th recording layers is always in a predetermined distance from a surface of the optical disc.

One embodiment of the present invention is a method described above, wherein focusing zone is provided on a surface of a recording layer which is furthest from the substrate among the first to the n-th recording layers, and the control means controls the shift means such that a distance between the focal point of the optical beam and the focusing zone is within a predetermined error range and performs learning for optimizing the focal point of the optical beam in the focusing zones.

One embodiment of the present invention is a method described above, wherein the selected recording layer from the first to the n-th recording layers is the recording layer furthest from the substrate.

One embodiment of the present invention is a method described above, wherein the optical disc includes tracks in a spiral state or concentric circle forms, and the control means controls the shift means such that the focal point of the optical beam skips every other track or every other circle of the tracks.

One embodiment of the present invention is a method described above, wherein AV information and code information for PC are alternately recorded in every other track or every other circle of the tracks.

One embodiment of the present invention is a method described above, wherein the predetermined recording layer is the recording layer furthest from the substrate, and the predetermined region is a control information zone in which control information of the optical disc is stored.

One embodiment of the present invention is a method described above, wherein the control information includes copyright information and registration information.

One embodiment of the present invention is a method described above, wherein: the data zones are allocated with physical addresses incremented along a predetermined direction; and the control means measures position error of corresponding physical addresses between the first to the n-th recording layers, the control means is controlled to add new control information to the control information of the optical disc based on the position error.

The present invention provides an optical disc comprising a substrate and a first to an n-th recording layers (n is an integer of 2 or greater) laminated onto the substrate, wherein each of the first to the n-th recording layers include data regions separated into a first to an m-th data zone groups (m is an integer of 2 or greater) along a radial direction of the optical disc, each of the first to the m-th data zone groups including at least one data zone, control information being recorded on a surface of the optical disc, thereby achieving the above-described objectives.

The present invention provides an optical disc comprising a substrate and a first to an n-th recording layers (n is an integer of 2 or greater) laminated onto the substrate, wherein each of the first to the n-th recording layers include data regions separated into a first to an m-th data zone groups (m is an integer of 2 or greater) along a radial direction of the optical disc, each of the first to the m-th data zone groups including at least one data zone, ROM information for reproduction of the optical disc being recorded on a surface of the optical disc, thereby achieving the above-described objectives.

BRIEF DESCRIPTION OF THE DRAWINGS

FIG. 2($a$) is a schematic cross-sectional view of an optional disc having a double-layer structure according to Embodiment 1;

FIG. 2($b$) is a schematic cross-sectional view illustrating a method (a direction and an order) for recording/reproducing information on/from the optical disc of FIG. 2($a$);

FIG. 4($b$) is a schematic cross-sectional view showing a method (a direction and an order) for recording/reproducing information on/from the optical disc of FIG. 4($a$);

FIG. 5($b$) shows a focus-jumping pulse having a wave-height value and a pulse width appropriate for a movement for every layer when the high-speed movement is required;

FIG. 7($a$) is a schematic cross-sectional view of an optical disc having a double-layer structure according to Embodiment 3;

FIG. 7($b$) is a schematic cross-sectional view illustrating a method (a direction and an order) for recording/reproducing information on/from the optical disc of FIG. 7($a$);

FIG. 9($a$) is a schematic cross-sectional view showing an embodiment of a three-layer disc having three recording layers laminated;

FIG. 9($b$) is a schematic cross-sectional view showing a method (a direction and an order) for recording/reproducing information on/from the optical disc of FIG. 9($a$);

FIG. 12($a$) is a schematic cross-sectional view of an optical disc having a double-layer structure (parallel-path type) according to Embodiment 6;

FIG. 12($b$) is a schematic cross-sectional view illustrating a method (a direction and an order) for recording/reproducing information on/from the optical disc of FIG. 12($a$);

FIG. 13($b$) is a schematic cross-sectional view illustrating a method (a direction and an order) for recording/reproducing information on/from the optical disc of FIG. 13($a$);

FIG. 14($b$) shows a partial enlarged view of tracks of an optical disc being recorded according to a conventional technique and waveforms of a tracking error signal (TE) and total reflection signal (AS) in such a case;

FIG. 14($c$) shows a partial enlarged view of tracks of an optical disc according to Embodiment 7 of the present invention and waveforms of a tracking error signal (TE) and AS in such a case;

FIG. 16($a$) is a plan view of an optical disc being recorded;

FIG. 16($b$) shows a partial enlarged view of tracks when recording is performed in every other track and a TE waveform and a jumping waveform;

FIG. 19 is a timing chart for illustrating a copyright protection process; and

FIG. 20 is a flowchart for illustrating a copyright protection process.

BEST MODE FOR CARRYING OUT THE INVENTION

Figure 1:
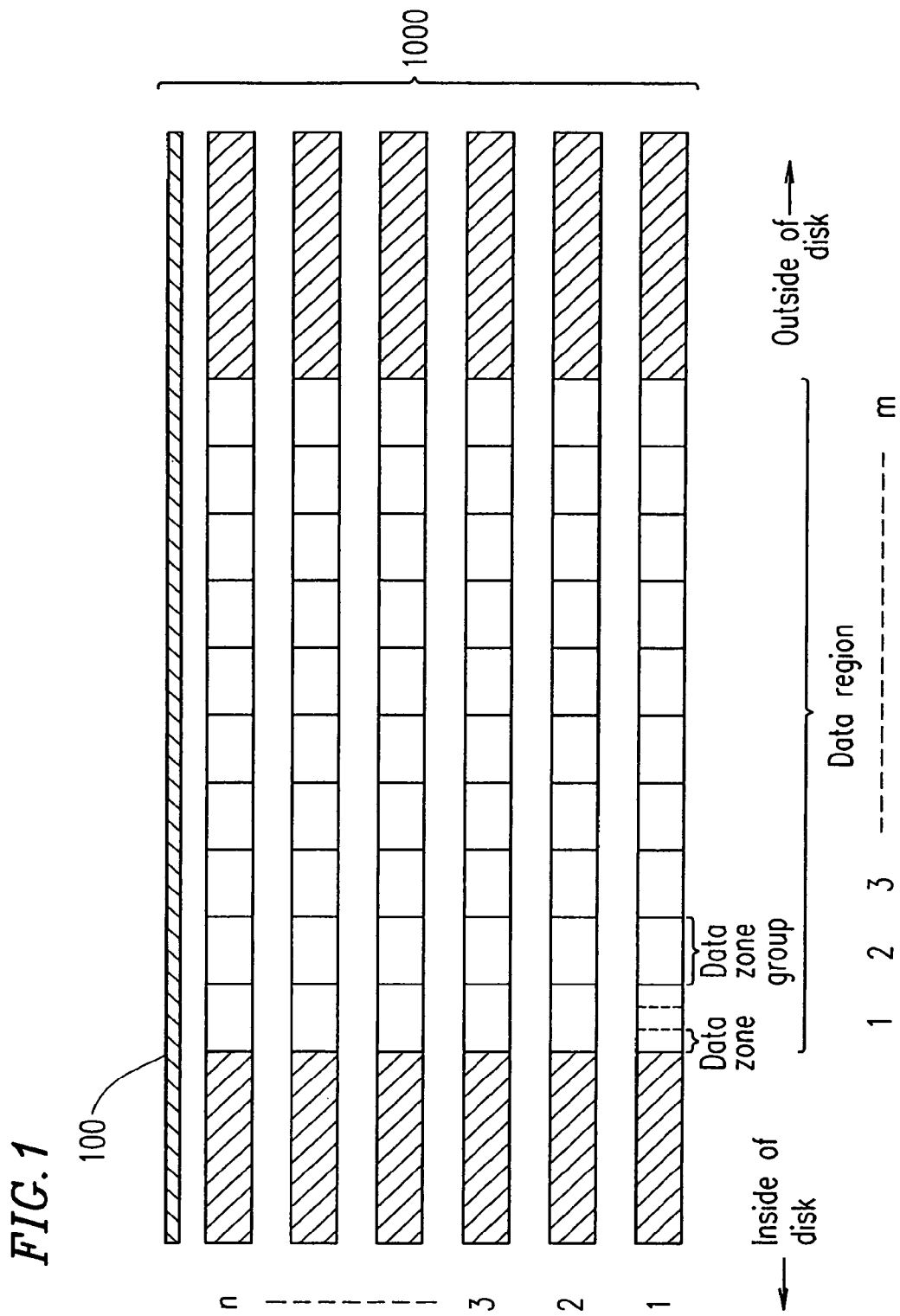
FIG. 1 is a schematic diagram showing a concept of a multi-layer type optical disc according to the present invention.

FIG. 1 is a schematic diagram showing a concept of a multi-layer type optical disc 1000 according to the present invention. The optical disc 1000 includes a substrate 100 and a first to an n-th recording layers laminated onto the substrate 100 (n is an integer which is equal to 2 or greater). Each of the first to the n-th recording layers has a data region segmented along a radial direction of the optical disc 1000 into a first to an m-th of data zone groups (m is an integer which is equal to 2 or greater). Each of the first to the m-th data zone groups includes at least one data zone (in an example shown in FIG. 1, a data zone group includes three data zones). Each of the first to the n-th recording layers may include regions other than the data region.

For recording/reproducing information on/from the optical disc 1000, (a) information is recorded/reproduced in a region from the j-th data zone group of the first recording layer to the j-th data zone group of the n-th recording layer, and (b) the step (a) is repeated for j=1, 2, ..., m. Such a recording/reproducing method using the multi-layer type optical disc according to the present invention is characterized in that each data zone groups forms a continuous information stream.

In FIG. 1, recording layers are sequentially numbered 1, 2, 3, ... n from the recording layer furthest from the substrate 100. However, the recording layers may be numbered 1, 2, 3, ... n from the recording layer closest to the substrate 100. The data zone groups are numbered 1, 2, 3, ... m from the inside to outside of the optical disc 1000, but they may be numbered 1, 2, 3, ... m from the outside to inside of the optical disc 1000.

Furthermore, one of the first to the n-th recording layers may be always at a predetermined distance from a surface of the disc.

Hereinafter, embodiments of the present invention will be described in more detail with reference to the drawings.

Embodiment 1

Figure 3:
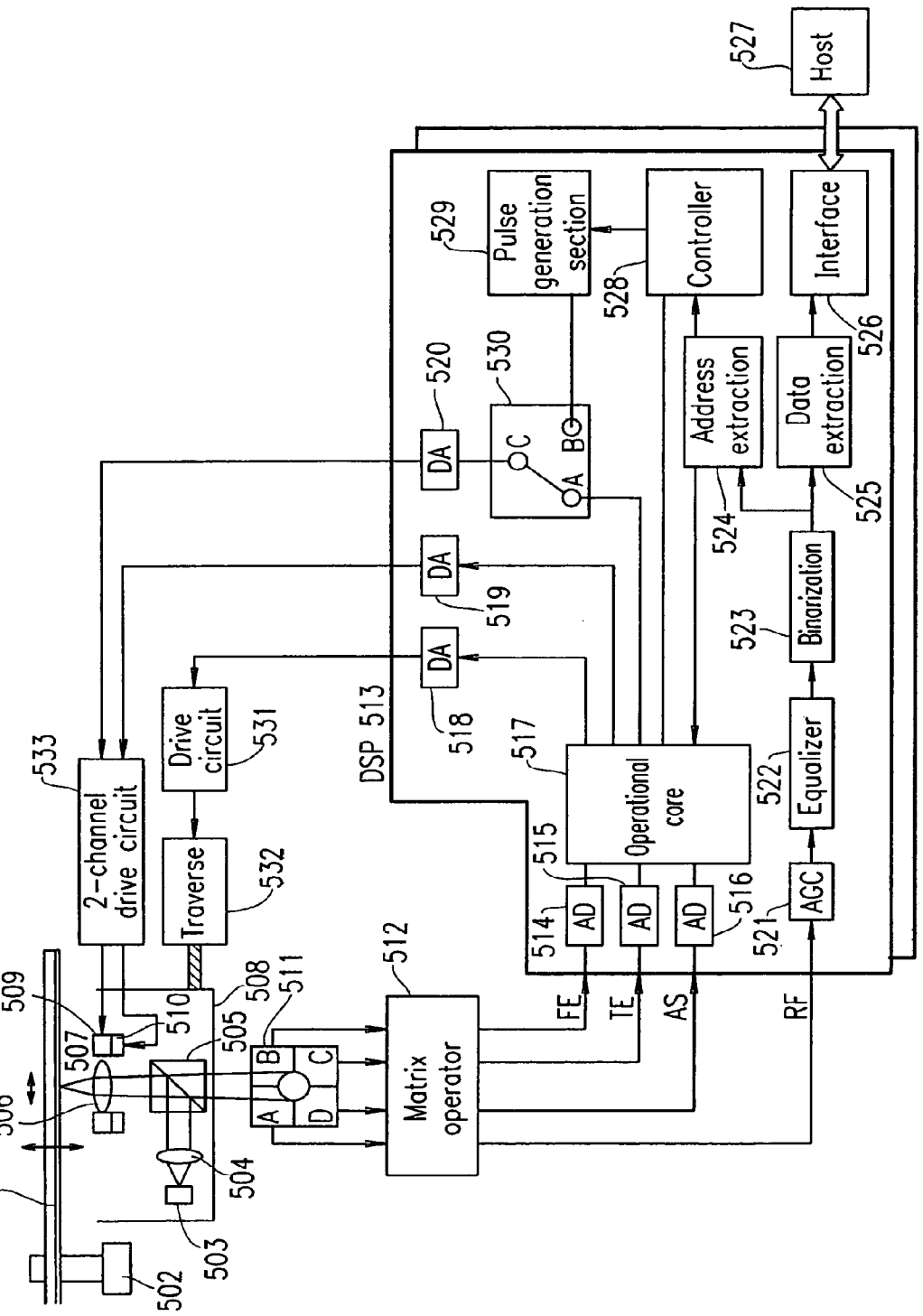
FIG. 3 is a block diagram showing a structure of an apparatus for recording/reproducing information on/from the optical disc according to the present invention.

FIG. 2(*a*) is a schematic cross-sectional view of an optical disc having a double-layer structure according to Embodiment 1. FIG. 2(*b*) is a schematic cross-sectional view illustrating a method (a direction and an order) for recording/reproducing information on/from the optical disc. FIG. 3 is a block diagram showing a structure of an apparatus for recording/reproducing information on/from the optical disc according to the present invention. Hereinafter, Embodiment 1 will be described with reference to FIG. 2(*a*), 2(*b*), and 3.

As shown in FIG. 2(*a*), the optical disc of the present embodiment is formed of a resin or glass substrate 4 and two recordable recording layers (an L1 layer 5 and an L0 layer 6) laminated thereto via an adhesive layer 7. Information surfaces of both the L0 layer 6 and the L1 layer 5 are on the sides further from the substrate. The L0 layer 6 is set to be about 70 to 85 μm and the adhesive layer is set to be about 30 μm. A distance between the disc surface and the information surface of the L1 layer is about 100-115 μm. In the L0 layer and the L1 layer of the optical disc of the present embodiment, from clamp areas 3 on the innermost periphery, bar code areas (system areas) 11 and 12, lead-in areas 21 and 22, gap areas 31 and 32, test areas 41 and 42, replacement information areas 51 and 52, replacement areas 61 and 62 are respectively located in inner system areas 120 and 121. Replacement areas 71 and 72, replacement information areas 81 and 82, lead out areas 91 and 92 are respectively located in outer system areas 124 and 125. Data areas 122 and 123 are respectively between the system areas 120 and 121 and the system areas 124 and 125.

The data areas 122 and 123 to and from which user data is recorded/reproduced are separated at predetermined positions along in a radial direction of the disc. The L0 layer includes data zones 101 to 109 and the L1 layer includes data zones 201 to 209 (in the present embodiment, there are nine zones for convenience of the explanation. However, the present invention is not limited to this, and any number of data zones is possible). The rate is switched for each zone. Data is recorded with a substantially stable linear speed (or linear density). The information thus recorded is reproduced.

An objective and a role of each area will be described. Bar codes are generated on surfaces of the bar code areas 11 and 12 by removing a part of a reflection film on a recording surface after the disc is formed using a laser cutting or the like, or by printing or applying an ink. The information of the bar codes includes key information for protecting copyrights, a serial number for managing support or the like, or information regarding kinds, the number of layers, the types (rewritable, write-once, read-only) or the like of the disc. Thus, information provided with basic characteristics is pre-recorded in the bar code areas 11 and 12.

The lead-in areas 21 and 22 are adjacent to the bar code areas 11 and 12. In the lead-in areas 21 and 22, the number of recording layers and capacities thereof, the type of the disc (read-only ROM disc, recordable RAM disc, or the like), physical information such as recording conditions in the case where the disc is of the recordable type, copyright information to be combined with bar codes or the like are pre-recorded as control data by emboss pit when the disc is formed. The gap areas 31 and 32 are adjacent to the lead-in areas 21 and 22. The gap areas 31 and 32 are in the border between the ROM regions usually formed with an emboss and RAM regions having a guiding track and a sector structure. The gap areas 31 and 32 usually serve as a mirror portion having high reflectances (they also serve as margin regions when lead-in regions are generated).

The test areas 41 and 42 are adjacent to the gap areas 31 and 32. The test areas 41 and 42 are test regions for being irradiated with laser at a recording power to learn an optimum value of laser power or the like, or for learning a target position of the focus control. The replacement information area 51 and 52 are adjacent to the test areas. The replacement information area 51 and 52 are regions for registering an address of a sector or a block which cannot be used because of defects or the like. The replacement areas 61 and 62 are adjacent to the replacement information areas 51 and 52. The replacement areas 61 and 62 are alternate regions corresponding to sectors or blocks which cannot be actually used.

Next, with reference to FIG. 3, the recording/reproducing apparatus according to the present invention will be described in detail. FIG. 3 is a block diagram of an apparatus for recording/reproducing information on/from the optical disc according to the present invention. The apparatus includes light receiving means for receiving an optical beam reflected off an optical disc, a shift means for shifting a position of a focal point of the optical beam along a direction of a lamination of recording layers in the optical disc, and control means for performing focus control such that a distance between the focal point of the optical beam and a recording layer selected from the first to the n-th recording layers is within a predetermined error range by controlling the shift means in accordance with output of the light receiving means. In FIG. 3, the light receiving means corresponds to a photodetector 511; the shift means corresponds to a tracking control element 509, a focus control element 510 and a 2-channel drive circuit 533; the control means corresponds to a DSP 513. The DSP 513 may control focusing and tracking so as to correct the position of the focal point of the optical beam in accordance with an output from the photodetector 511.

An optical beam is emitted from a light source 503 such as a semiconductor laser. The optical beam is collimated with a coupling lens 504. Then, via a polarizing element 505, the optical beam is applied to the disc 501 as a focal point of the optical beam (an optical beam spot) 507 with a converging lens 506. The reflected light passes through the polarizing element 505, and is received at the photodetector 511 divided into four sections and converted into an electric signal. Then, a matrix operator 512 generates a focus error (FE) signal, a tracking error (TE) signal, and an RF signal by astigmatism. Various types of methods can be used for signal generation. Typical methods include a focus error detection by astigmatism using a differential between sums of opposite diagonal sections of four sections arranged in a square, a tracking error detection by push-pull using a differential of two divided section in the disc radial direction and using a difference in intensities in first order diffraction light of the track, and RF generation by addition of the all four sections arranged in a square, and the like.

The focus error (hereinafter, referred to as FE) generated in the matrix operator 512 is digitalized in an AD converter 514 incorporated in the DSP 513. Operations for phase compensation and gain compensation are performed in an internal operational core 517. The FE is analog-converted by an incorporated DA converter 520 and amplified by the drive circuit 533 of two channels. Then, the FE is output to the focus control element 510. Thus, the optical beam is focused on the information surface of the disc 501 as a spot and controlled to have a predetermined converged state. Similarly, the tracking error (hereinafter, referred to as TE) generated in the matrix operator 512 is digitalized in an AD converter 515 incorporated in the DSP 513. Operations for phase compensation and gain compensation are performed in the internal operational core 517. The TE is analog-converted by an incorporated DA converter 519 and amplified by the drive circuit 533 of two channels. Then, the TE is output to the tracking control element 509. Thus, the optical beam spot is controlled so as to correctly scan tracks on the disc 501.

Similarly, the AS signal generated in the matrix operator 512 is also digitalized in an AD converter 516 incorporated in the DSP 513. Dividing operations of the TE and FE (AGC) are performed in the internal operational core 517. Thus, a gain of a servo loop can be maintained constant even when a semiconductor laser reaches a recording power or an input amplification of an input of FE or TE is varied by a change in the reflectance of the disc due to recording.

The RF signal is made to have a constant amplification by a dedicated AGC circuit 521. Then, an equalizer 522 formed of a high-order equal ripple filter enhances a signal band. Then, the signal is converted into a binary data by a binary circuit 523. The binary data is input to an address extraction circuit 524 and a data extraction circuit 525, respectively. The address obtained by the address extraction circuit 524 is input to a controller 528. A difference in addresses of a region, in which desired data requested by a host 527 via an interface 526 is stored, is calculated. An instruction in accordance with the calculated difference is sent to the operational core 517. The optical beam spot 507 is shifted in a radial direction of the disc by a traverse motor 532 and to an information surface of the desired layer by a pulse generation section 529 and a switch 530 to search a predetermined region.

After searching a predetermined region, data is retrieved by the data extraction circuit 525. Error correction or decoding (not shown) is performed. Then, data is sent to a host or the like via the interface circuit 526. For recording a signal, similarly, an initial address of a position to be recorded is input to a controller by an instruction command by the host. Based on a difference in addresses between the initial address and the present address obtained by the address extraction circuit 524, the optical beam is moved to the desired position. A recording pulse modulated in accordance with a recording data encoded by an encode circuit (not shown) is recorded by the semiconductor laser 503.

A process flow for starting up the apparatus of the present embodiment and recording/reproducing information on/from an optical disc will be described in detail.

First, a start-up procedure and a method thereof will be described. When the apparatus is powered, the operational core 517 drives the traverse motor 532 via a DA converter 518 and a drive circuit 531. Thus, the optical beam is shifted near the inner periphery of the disc 501. The disc 501 is rotated with a predetermined rate by a spindle motor. Further, focus control element 510 is moved to become closer or further to the disc 501 to detect a focus error. The optical beam is focused on the layer L0 closer to the converging lens 506. Then, the tracking control element 509 is driven to perform tracking control. Thus, it is possible to detect an RF signal stably. Address information on a track is extracted by the address extraction circuit 524 to recognize the track currently being scanned by the optical beam.

Next, a predetermined track of the lead-in areas 21 or 22 in which the type of the disc or control information on book type is written is accessed. The track being scanned and the track of the lead-in area may have different physical shapes and thus, the tracking error detection method may be switched. In this case, the optical beam is first shifted to a head track of the gap area, i.e., a border, and then shifted again from the head track to the predetermined track of the lead-in area. The tracking detection scheme is switched, for example, from a phase-difference method to a push-pull method, immediately before or after the shift.

When the optical beam is shifted to the predetermined track of the lead-in area 21 and required information is obtained in the portion, the detection scheme of the tracking error is switched back. The optical beam spot is shifted to the test area 41 to perform learning of the laser power or the recording pulse width and so on for improving quality of a recording or reproduction signal, or learning of a target position of the focus control. When the learning has finished, the optical beam spot is then shifted to replacement information area 51. Information on the presence/absence of a portion which cannot be recorded due to a defect of the disc and so on and the position thereof, and the presence/absence of a replacing portion and the position thereof are read and stored in a memory of a system controller. The process will be performed with reference to this information when the recording/reproducing command is issued thereafter.

When the double-layer (or multi-layer) disc is used, a focus jumping is performed to move from the L0 layer to the L1 layer. The similar process will be repeated for the test area 42 and the replacement information area 52 of the L1 layer (basically, in the case of the multi-layer disc, this process may be repeated). When necessary information is obtained for all necessary layers, the start-up process is finished in principle. In this case, if the optical beam spot stands by the start address of the L0 layer, it is easy to proceed to the next process. In the case where the information cannot be read from the lead-in of the L0 layer (the layer closer to the surface), the focus jumping is performed from that position. A lead-in of the layer which can be read is accessed. Accordingly, the lead-in area 22 of the L1 layer stores control information shared in the disc. In FIG. 2(a), focus positions of the optical beam spot 207 on the L0 layer and the L1 layer are respectively shown in a solid line and a dotted line.

Next, a procedure and a method for recording a desirable data in data areas 122 and 123 of an optical disc will be described with reference to FIG. 2(b). For better understanding, continuous recording of long-duration motion pictures will be described. FIG. 2(b) shows a movement of an optical beam while a long-duration motion picture is being continuously recorded on an optical disc by a recording/reproduction apparatus according to the present embodiment. When the start-up of the apparatus is finished in accordance with the above-mentioned start up procedure, an optical beam spot 207 is located at a substantial head portion, track S of the data area 101. When recording is performed for the first time, the recording is started from this head track 101S. Tracks basically form a spiral structure, and as the optical beam spot scans a track, the information is sequentially recorded from track S to track E. When recording reaches a substantial end track E of the data zone 101, it is temporarily switched to a reproduction mode, and focus jump is performed. The optical beam spot 207 is moved to a data zone 201 of an L1 layer and then seeks the substantial starting track S of the data zone 201 to resume recording.

A method of focus jump is performed as follows. When a command is received by the operational core 517 from the host 527 or the controller 528 similarly to an instruction for search, i.e., when an optical beam reaches the last address of the data zone by a spiral operation, the switch 530 is switched from connection of A and C to connection of B and C. The focus control is released. A predetermined acceleration pulse and a deceleration pulse are applied to the focus control element 510 via the switch 530, the DA converter 520, and the 2-channel driving circuit 533 from the pulse generation section 529. Thus, the focus jump is performed. Specific control methods, such as generation of the acceleration/deceleration pulse, or timing is not directly related to the present invention, and can be structured similarly as in the conventional technique (Japanese Laid-Open Publication No. 9-326123). Thus, the detailed explanation is omitted herein.

Similar to the tracks on the L0 layer, tracks on the L1 layer which is positioned just above the L0 layer basically form a spiral structure running from the inner periphery to the outer periphery. As the optical beam spot scans the track, information is sequentially recorded from track S to track E. When the recording reaches the substantial end track E of the data zone 201, it is temporarily switched to the reproduction mode, and focus jump is performed in a reverse direction (downward direction in FIG. 2(*b*)) to move to start track S of a data zone 102 adjacent to the data zone 101 of the L0 layer. Then, the recording is resumed from the substantial start track S of the data zone 102. A similar process is continued until the recording of the data to be recorded is finished. Data is sequentially recorded from the data zones 101, 201, 102, 202, 103, . . . , 209.

When the recording is completed in the middle of the disc, a start finish address of one volume including finish position information, a capacity, and the like is registered in a logical management region are provided in a predetermined region. For performing recording next time with increment, with reference to the information, the start address is accessed. The start address is different for this recording, but sequence of movements between layers and zones are similar as in the above-described case. When data of a PC or the like is recorded instead of motion pictures, the procedures for recoding are basically the same. The above-mentioned management region is used as a replacement information region regarding a defect region of the disc and a replacement region to enhance reliability of the data.

Next, a procedure and a method for reproducing a desired data will be described. A movement of optical spot for reproduction is basically the same as that for recording. If long-duration motion pictures are recorded across almost the entire surface, the optical beam spot is moved from track S of the data zone 101 of an initial position to a head address of a desired chapter or a head address of a desired data in accordance with navigation information in the management region, or a request from a host PC, a remote control or the like. Then, the optical beam spot moves between zones and layers, similarly. For example, when a recorded movie is reproduced from the beginning, reproduction starts from the head track 101S. Tracks basically form a spiral structure. Thus, as the optical beam spot scans a track, data are sequentially reproduced from track S to track E. When the reproduction reaches the substantial end track E of the data zone 101, focus jumping is performed. The optical beam spot is moved to the data zone 201 of the layer L1 and seek for the substantial start track S of the data zone 201 is performed to resume reproduction.

Similar to the tracks on the L0 layer, tracks on the L1 layer basically form a spiral structure running from the inner periphery to the outer periphery. When the optical beam spot scans the track, the data is sequentially reproduced from track S to track E. When the reproduction reaches the substantial end track E of the data zone 201, focus jumping is performed in a reverse direction to move the optical beam spot to the initial track S of the data zone 102 adjacent to the data zone 101 of the L0 layer. Then, the reproduction is resumed from the substantial start track S of the data zone 102 until the reproduction is finished. Data is sequentially reproduced from the from the data zones 101, 201, 102, 202, 103, . . . , 209.

Physical addresses are allocated in the data zones such that they are incremented along a predetermined direction. It is preferable that an incremental direction of the physical addresses in the data zones of the first recording layer (L0 layer) and in that of the second recording layer (L1 layer) are the same. If they are not the same, a head address of each zone may be stored and managed by a system. If physical addresses are simply allocated, for example, from the inner periphery to the outer periphery (or from the outer periphery to the inner periphery) in an ascending order from L0 for each layer, so as to match an order and a direction of zones to which physical addresses are recorded including a replacement process for defect or the like, a structure of a disc can be simplified. The present embodiment has been described with respect to the operation where both the L0 layer and the L1 layer are parallel path spirals from the inner periphery to the outer periphery. However, the present invention is not limited to this, and the L0 layer and L1 layer may be parallel spirals from the outer periphery to the inner periphery.

Embodiment 2

Figure 4:
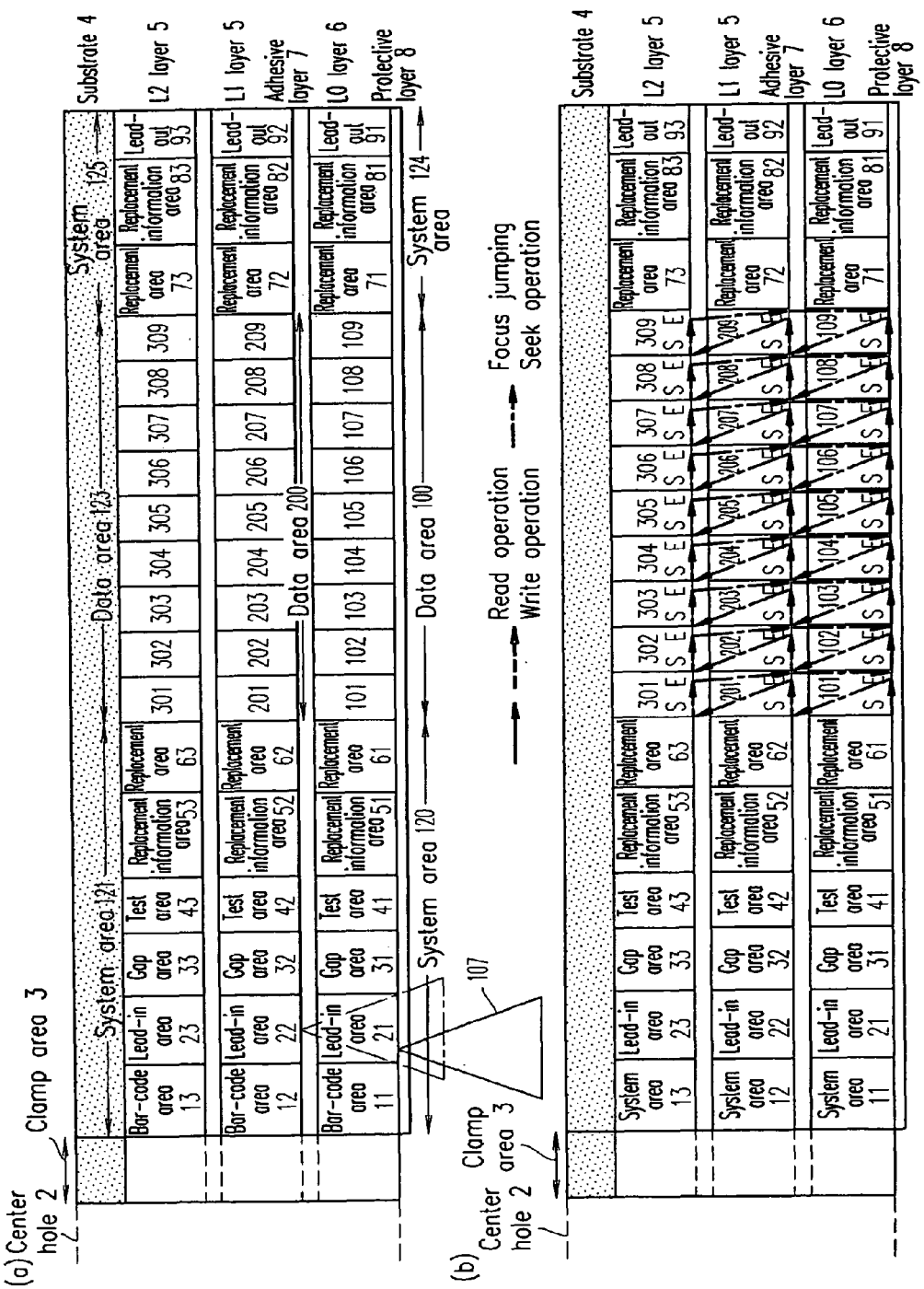
FIG. 4($a$) is a schematic cross-sectional view of an optical disc having a three-layer structure according to embodiment 2.

FIG. 4(*a*) is a schematic cross-sectional view of an optical disc having a three-layer structure according to embodiment 2. FIG. 4(*b*) is a schematic cross-sectional view showing a method (a direction and an order) for recording/reproducing information on/from the optical disc. Regions in the same radial directions of the L0, L1, and L2 layers of the three-layer optical disc basically have similar roles as regions of regions of L0 and L1 of the double-layer disc in FIG. 1.

Data areas 100, 200, and 300 of the three-layer disc are all parallel paths having the same spiral directions. In other words, data zones of each data area are allocated with physical addresses incremented in a predetermined direction, and the incremental direction of the physical addresses in the data zones of the first recording layer, the incremental direction of the physical addresses in the data zones of the second recording layer, and the incremental direction of the physical addresses in the data zones of the third recording layer are the same. In the present embodiment, the incremental direction of the physical addresses in each of the recording layers is from the inner periphery to the outer periphery of the disc.

Next, a procedure and a method for recording in these data areas will be described with reference to FIG. 4(*b*). For better understanding, continuous recording of long-duration motion pictures will be described. An optical beam spot 107 is located at track 101S, which is a substantial head portion of the data area 101 of the L0 layer of the disc 201. When recording is performed for the first time, the recording is started from this head track 101S. Tracks basically form a spiral structure, and as the optical beam spot scans a track, the information is sequentially recorded from track S to track E. When the recording reaches a substantial end track 101E of the zone 101, it is temporarily switched to a reproduction mode, and focus jump is performed. The optical beam spot 207 is moved to a zone 201 of an L1 layer and then seeks the substantial start track 201S of the zone 201 to resume recording.

A method of focus jump is performed as follows. When a command is received by the operational core 517 from the host 527 or the controller 528 similarly to an instruction for search, i.e., when an optical beam reaches the last address of the data zone by a spiral operation, the switch 530 is switched from connection of A and C to connection of B and C. The focus control is released. A predetermined acceleration pulse and a deceleration pulse are applied to the focus control element 510 via the switch 530, the DA converter 520, and the 2-channel driving circuit 533 from the pulse generation section 529. Thus, the focus jump is performed. Specific control methods, such as generation of the acceleration/deceleration pulse, or timing is not directly related to the present invention, and can be structured similarly as in the conventional technique. Thus, the detailed explanation is omitted herein.

Similar to the tracks on the L0 layer, tracks on the L1 layer which positioned just above the L0 layer basically has a spiral structure running from the inner periphery to the outer periphery. As the optical beam spot scans the track, information is sequentially recorded from track 201S to track 201E. When the recording reaches the substantial end track 201E of the zone 201, it is temporarily switched to the reproduction mode. The optical beam spot 107 is moved to a zone 301 of the L2 layer which locates further above. A seek for the substantial start track 301S of the zone 301 is performed and then the recording is resumed.

Similar to the L0 layer and the L1 layer, tracks of the L2 layer located above basically form a spiral structure running from the inner periphery to the outer periphery. As the optical beam spot scans the tracks, data is sequentially recorded from the track 301S and the track 301E.

When the recording reaches the substantial end track 301E of the zone 301, it is temporarily switched to the reproduction mode. Focus jump is performed in a reverse direction (downward direction in FIG. 4(b)) to move the optical beam from the L2 layer to the L0 layer, passing through the L1 layer. Then the optical beam spot is moved to a start track 102 S of a data zone 102. Then, the recording is resumed from the substantial start track 102 S of the zone 102. A similar process is continued until the recording of the data to be recorded is finished. Data is sequentially recorded from the zones 101, 201, 301, 102, 202, 302, 103, 203 . . . , 309.

As shown in FIG. 5(a), for the focus jumping in a multi-layer disc across the L2 layer to the L0 layer, a focus jumping pulse having a wave-height value and a pulse width appropriate for a movement for every layer is output to the focus control element 510. The optical beam is focused onto every layer, from L2, L1, to L0, before outputting a next focus jumping. Thus, the optical beam can be stably moved. On the other hand, when a fast movement is required, as shown in FIG. 5(b), a focus jumping pulse having a wave-height value and a pulse width in accordance with the number of layers across which the optical beam moves, i.e., movement distance is output to the focus control element 510. Further, zero-cross or the like of FE or binary signal is detected and counted to reach a data area of a desirable layer.

Next, a procedure and a method for reproducing a desired data in a three-layer disc will be described. A movement of optical beam spot for reproduction is basically the same as that for recording. If long-duration motion pictures are recorded across almost entire surface, the optical beam spot is moved from track 101S of the zone 101 of an initial position to a head address of a desired chapter or a head address of a desired data in accordance with navigation information in the management area, or a request from a host PC, a remote control or the like. Then, the optical beam spot moves between zones and layers, similarly. For example, when a recorded movie is reproduced from the beginning, reproduction starts from the head track 101S. Tracks basically form a spiral structure. Thus, as the optical beam spot scans a track, data are sequentially reproduced from track 101S to track 110E. When the reproduction reaches the substantial end track 101E of the data zone 101, focus jumping is performed. The optical beam spot is moved to the zone 201 of the layer L1 and a seek for the substantial start track 201S of the zone 201 is performed to resume reproduction. Similar to the tracks on the L0 layer, tracks on the L1 layer basically form a spiral structure running from the inner periphery to the outer periphery. When the optical beam spot scans the track, the data is sequentially reproduced from track 201S to track 201E. When the reproduction is finished at the substantial end track 201E of the zone 201, similar in the case of the L1 layer, focus jumping of the optical beam spot to the zone 301 of the L2 layer located above is performed. Tracks of the L2 layer also basically form a spiral structure running from the inner periphery to the outer periphery. As the optical beam spot scans the track, data are sequentially reproduced from the track 301S to the track 301E.

When the reproduction is finished at the substantial end track 301E of the zone 301, the focus jumping is performed in a reverse direction (downward direction in FIG. 4(b)) to move the optical beam from the L2 layer to the L0 layer, passing through the L1 layer. Then, the optical beam spot is moved to the initial track 102S of the data zone 102. Then, the reproduction is resumed from the substantial start track 102S of the zone 102. Then, similar process is continued until the reproduction of the data to be reproduced is finished. Data is sequentially reproduced from the zones 101, 201, 301, 102, 202, 302, 103, 203 . . . , 309.

Figure 6:
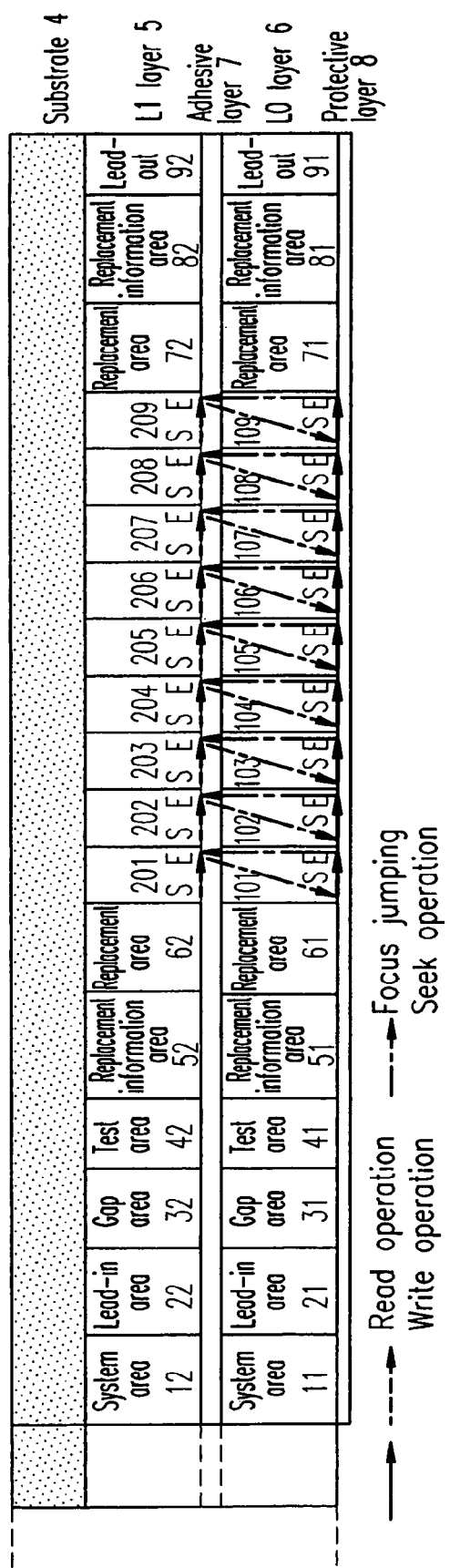
FIG. 6 is a schematic cross-sectional view illustrating a method for recording/reproducing information to/from the layer closest to a substrate (L1 layer) in a double-layer disc (parallel-path type)

Similar to the double-layer disc, it is preferable that the physical addresses for access are incremented in a direction same as the orders of the zones across which the optical beam spot moves. If they are not the same, a head address of each zone may be stored and managed by a system. If physical addresses are simply allocated, for example, from the inner periphery to the outer periphery (or from the outer periphery to the inner periphery) in an ascending order for each layer, so as to match an order and a direction of zones to which physical addresses are recorded including a replacement process for defect or the like, a structure of a disc can be simplified. The present embodiment has been described with respect to the operation where both L0 layer, L1 layer, and the L2 layer have spiral structure from the inner periphery to the outer periphery. However, the present invention is not limited to this. The L0 layer and the L2 layer may have the spiral structure running from the outer periphery to the inner periphery while the L1 layer may have a spiral structure running from the inner periphery to the outer periphery. The present embodiment is structured such that recording/reproduction is performed from the outermost (the furthest from the substrate) zone 101 of the L0 layer. However, the recording/reproduction may be started from the head zone of the data area located in the innermost (the closest to the substrate) layer. As an example, FIG. 6 shows a schematic cross-sectional view illustrating a method for recording/reproducing information on/from the layer closest to the substrate (L1 layer) in a double-layer disc.

Embodiment 3

FIG. 7(a) is a schematic cross-sectional view of a structure of an optical disc according to Embodiment 3. FIG. 7(b) is a schematic cross-sectional view illustrating a method (a direction and an order) for recording/reproducing information on/from the optical disc. The present embodiment can be implemented with a structure similar to that shown in FIG. 3 by only alternating µ codes of the DSP 513 and the host 527 or a sequence process of software. Embodiment 3 is an opposite path type where the spiral direction of the L0 layer is opposite to that of the L1 layer. A procedure and a method for recording desired data in a data area of a disc in this case will be described.

For better understanding of the present invention, similar to Embodiment 1, continuous recording of long-duration motion pictures will be described. When starting up is finished in accordance with the above-mentioned start-up procedure, an optical beam spot is located at track S, which is a substantial head portion of a data zone 101 of an optical disc. When recording is performed for the first time, the recording is started from this head track 101S. Tracks basically form a spiral structure, and as the optical beam spot scans a track, the information is sequentially recorded from track S to track E. When recording reaches a substantial end track E of the zone 101, it is temporarily switched to a reproduction mode, and focus jumping is performed. The optical beam spot is moved to a data zone 201 of an L1 layer and then seeks the substantial starting track S of the data zone 201 to resume recording. A method for controlling focus jumping is not directly related to the present invention, and can be structured similarly as in the conventional technique. Thus, the detailed explanation is omitted herein.

Opposite to the tracks on the L0 layer, tracks on the L1 layer basically form a spiral structure running from the outer periphery to the inner periphery. As the optical beam spot scans the track, information is sequentially recorded from track S to track E from the outer periphery side. When the recording reaches the substantial end track E of the data zone 201, it is temporarily switched to the reproduction mode, and focus jump is performed in a reverse direction (downward direction in FIG. 7(*b*)) to move to start track S of a data zone 102 adjacent to the data zone 101 of the L0 layer. Then, the recording is resumed from the substantial start track S of the data zone 102. A similar process is continued until the recording of the data to be recorded is finished. Data is sequentially recorded from the data zones 101, 201, 102, 202, 103, . . . , 209.

When the recording is completed in the middle of the disc, a start finish address of one volume including finish position information, a capacity, and the like is registered in a logical management region provided in a predetermined region. For performing recording next time with increment, with reference to the information, the start address is accessed. The start address for this recording is different from that of the previous recording, but sequence of movements between layers and zones are similar as in the above-described case. When data of a PC or the like is recorded instead of motion pictures, the procedures for recoding are basically the same. The above-mentioned management region is used as a replacement information region regarding a defect area of the disc and a replacement area to enhance a reliability of the data. In FIG. 7(*a*), focus positions of the optical beam spot 207 on the L0 layer and the L1 layer are respectively shown in a solid line and a dotted line.

Next, a procedure and a method for reproducing a desired data will be described. A movement of optical beam spot for reproduction is basically the same as that for recording. If long-duration motion pictures are recorded across almost the entire surface, the optical beam spot is moved from track S of the data zone 101 of an initial position to a head address of a desired chapter or a head address of a desired data in accordance with navigation information in the management region, or a request from a host PC, a remote control or the like. Then, the optical beam spot moves between zones and layers, similarly. For example, when a recorded movie is reproduced from the beginning, reproduction starts from the head track 101S. Tracks basically form a spiral structure. Thus, as the optical beam spot scans a track, data are sequentially reproduced from track S to track E. When the reproduction reaches the substantial end track E of the data zone 101, focus jumping is performed. The optical beam spot is moved to the data zone 201 of the layer L1 and seek for the substantial start track S of the data zone 201 is performed to resume reproduction. Opposite to the tracks of the L0 layer of the data zone 101, tracks on the L1 layer basically form a spiral structure running from the outer periphery to the inner periphery. When the optical beam spot scans the track, the data is sequentially reproduced from track S to track E from the outer periphery side of the disc. When the reproduction reaches the substantial end track E of the data zone 201, focus jumping is performed in a reverse direction (downward direction in FIG. 7(*b*)) to move the optical beam spot to the initial track S of the data zone 102 adjacent to the data zone 101 of the L0 layer. Then, the reproduction is resumed from the substantial start track S of the data zone 102, and the similar process is continued until the reproduction of the data to be reproduced is finished. Data is sequentially reproduced from the data zones 101, 201, 102, 202, 103, . . . , 209.

The movement of optical beam spot as described above is indicated by an arrow in FIG. 7(*b*). One of the major characteristics of Embodiment 3 is that a seamless reproduction can be implemented with less buffer. This point will be further described.

Figure 8:
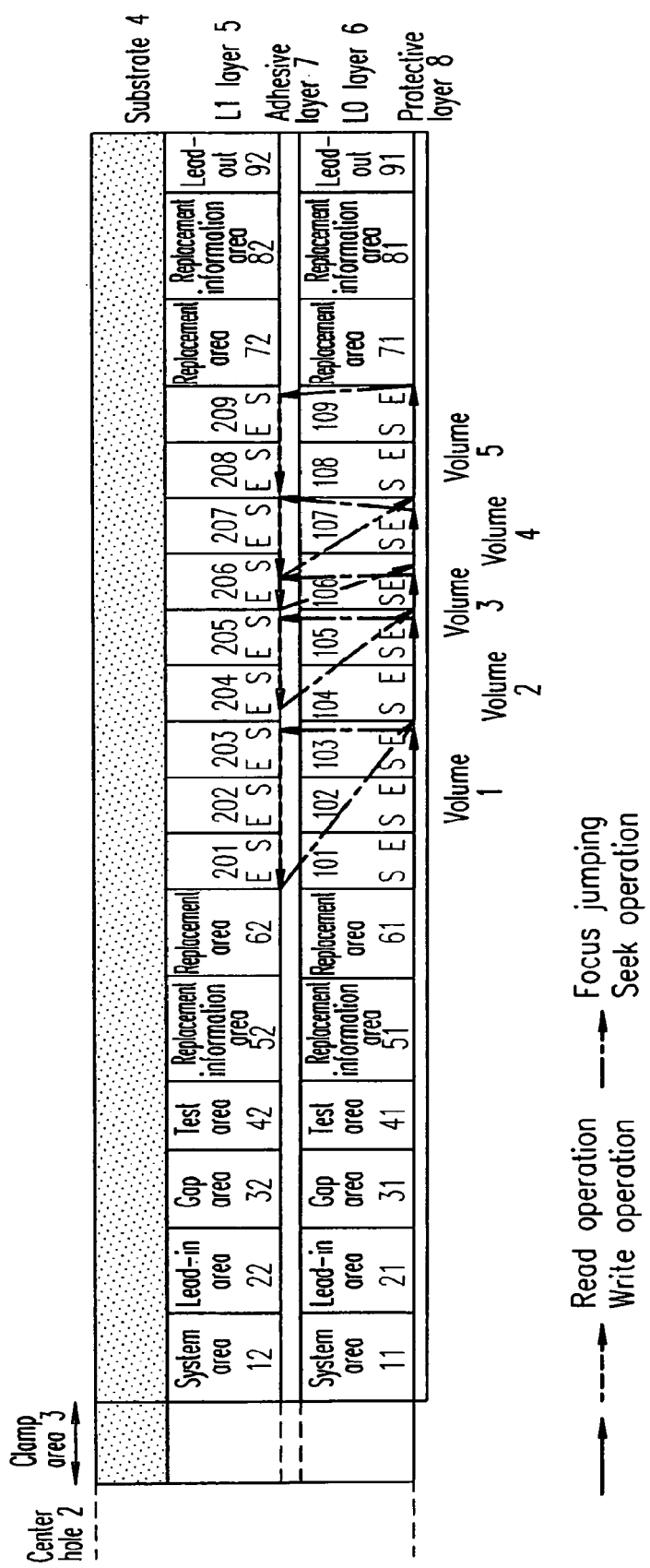
FIG. 8 is a schematic cross-sectional view illustrating a method (a direction and an order) for recording/reproducing information on/from an optical disc when information is continuously recorded across two or more data zones.

Basic operations are as described above. The optical beam spot is moved in spiral from the inner periphery to the outer periphery for the zones of the L0 layer, from the outer periphery to the inner periphery for the zones of the L1 layer so as to record/reproduce data. The end track E of the data zone 101 of the L0 layer and the start track S of the data zone 201 of the L1 layer are positioned to be almost perpendicular with respect to each other. When focus jumping from the L0 layer to the L1 layer is performed, the optical beam spot reaches at a position near the next start track. Thus, a time for resuming the recording or the reproduction can be significantly reduced. As shown in FIG. 8, for continuously recording motion picture data across two or more data zones (in this case, a plurality of data zones may be referred to as a data zone group), if a length of a file or motion picture data to be recorded has been already known because it is a timer-set recording or from a supplementary program data and so on, a little over more than half the data may be recorded in the data zone group of the L0 layer, and then the focus jumping may be performed to record the remaining data in the data zone group of the L1 layer.

In the case where the recording is started by suddenly pressing the record button, the recording/reproduction is performed without a pause if the disc is structured such that the above basic operation is performed and a transfer rate for recording is temporarily reduced during the time-consuming zone switching from the L1 layer to the L0 layer and then after stabilization of the transfer rate the data are recorded with original transfer rate. Thus, volume management of each of data or a file to be recorded can be performed. As shown in FIG. 8, recording/reproduction may be implemented with the number of tracks (the number of data zones) to be continuously recorded in each of the layers being switched and managed in accordance with their sizes, Volume 1, Volume 2, Volume 3, and Volume 4.

In the present embodiment, similarly to Embodiment 1, physical addresses are allocated in the data zones such that they are incremented along a predetermined direction. It is preferable that an incremental direction of the physical addresses in the data zones of the first recording layer (L0 layer) and the incremental direction of the physical addresses in the data zones of the second recording layer (L1 layer) are the same. If they are not the same, a head address of each zone may be stored and managed by a system. If physical addresses are simply allocated, for example, from the inner periphery to the outer periphery for the L0 layer and vice versa for the L1 layer in an ascending order, so as to match an order and a direction of zones to which physical addresses are recorded including a replacement process for defect or the like, a structure of a disc can be simplified. In the above description of Embodiment 3, the physical addresses are allocated from the inner periphery to the outer periphery for the L0 layer and vice versa for the L1 layer in an ascending order. In an opposite manner, the physical addresses may be allocated from the outer periphery to the inner periphery for the L0 layer and vice versa for the L1 layer in an ascending order.

Embodiment 4

FIG. 9(a) shows an embodiment of a three-layer disc having three recording layers laminated. FIG. 9(b) is a schematic cross-sectional view showing a method for recording/reproducing information on/from the optical disc. Regions in the same radial directions of the L0, L1, and L2 layers of the three-layer optical disc basically have similar roles as regions of L0 and L1 of the double-layer disc of FIG. 2.

In the three-layer disc, each data zone is allocated with physical addresses incremented along a predetermined direction, and the incremental direction of the physical addresses in the data zones of the first recording layer and the incremental direction of the physical addresses in the data zones of the third recording layer are the same, and the incremental direction of the physical addresses in the data zones of the first recording layer and the incremental direction of the physical addresses in the data zones of the second recording layer are opposite. In other words, in data areas 100, 200, and 300, spiral directions are alternately opposite in each layer. In the present embodiment, the data area 100 of the L0 layer has a spiral direction from the inner periphery to the outer periphery, the data area 200 of the L1 layer has a spiral direction from the outer periphery to the inner periphery, and the data area 300 of the L2 layer has a spiral direction from the inner periphery to the outer periphery.

Next, a procedure and a method for recording data in these data areas will be described with reference to FIG. 9(b). For better understanding, continuous recording of long-duration motion pictures will be described. An optical beam spot is located at track 101S, which is a substantial head portion of the data area zone 101 of the L0 layer of the optical disc. When recording is performed for the first time, the recording is started from this head track 101S. Tracks basically form a spiral structure, and as the optical beam spot scans a track, the information is sequentially recorded from track S to track E, from the inner periphery toward the outer periphery of the disc. When the recording reaches a substantial end track E of the zone 101, it is temporarily switched to a reproduction mode, and focus jump is performed. The optical beam spot is moved to a zone 201 of an L1 layer and then seeks the substantial start track 201S of the zone 201 to resume recording.

A method of focus jump is performed as follows. When a command is received by the operational core 517 from the host 527 or the controller 528 similarly to an instruction for search, i.e., when an optical beam reaches the last address of the data zone by a spiral operation, the switch 530 is switched from connection of A and C to connection of B and C. The focus control is released. A predetermined acceleration pulse and a deceleration pulse are applied to the focus control element via the switch 530, the DA converter 520, and the 2-channel driving circuit 533 from the pulse generation section 529. Thus, the focus jump is performed. Specific control methods, such as generation of the acceleration/deceleration pulse, or timing is not directly related to the present invention, and can be structured similarly as in the conventional technique. Thus, the detailed explanation is omitted herein.

Opposite to the L0 layer, tracks of the zone 201 of the L1 layer which positions above the L0 layer basically has a spiral structure running from the outer periphery to the inner periphery. As the optical beam spot scans the track, information is sequentially recorded from track 201S on the outside of the disc to track 201E.

When the recording reaches the substantial end track 201E of the zone 201, it is temporarily switched to the reproduction mode. The optical beam spot is moved to a zone 301 of the L2 layer which locates further above. Similar to the L0 layer, the L2 layer has a spiral structure running from the inner periphery to the outer periphery. A seek for the substantial start track 301S of the zone 301 is performed and then the recording is resumed.

In zone 301, similar to the zone 101 of the L0 layer, tracks form a spiral structure running from the inner periphery to the outer periphery. As the optical beam spot scans the tracks, data are sequentially recorded from the track 301S of the inside of the disc to the track 301E.

When the recording reaches the substantial end track 301E of the zone 301, it is temporarily switched to the reproduction mode. Focus jump is performed in a reverse direction (downward direction in FIG. 9(b)) to move the optical beam from the L2 layer to the L0 layer, passing through the L1 layer. Then the optical beam spot is moved to start track 102S of a zone 102 located in substantially the same radius. Then, the recording is resumed from the substantial start track 102S of the zone 102. A similar process is continued until the recording of the data to be recorded is finished. Data is sequentially recorded from the zones 101, 201, 301, 102, 202, 302, 103, 203 . . . , 309.

Figure 5:
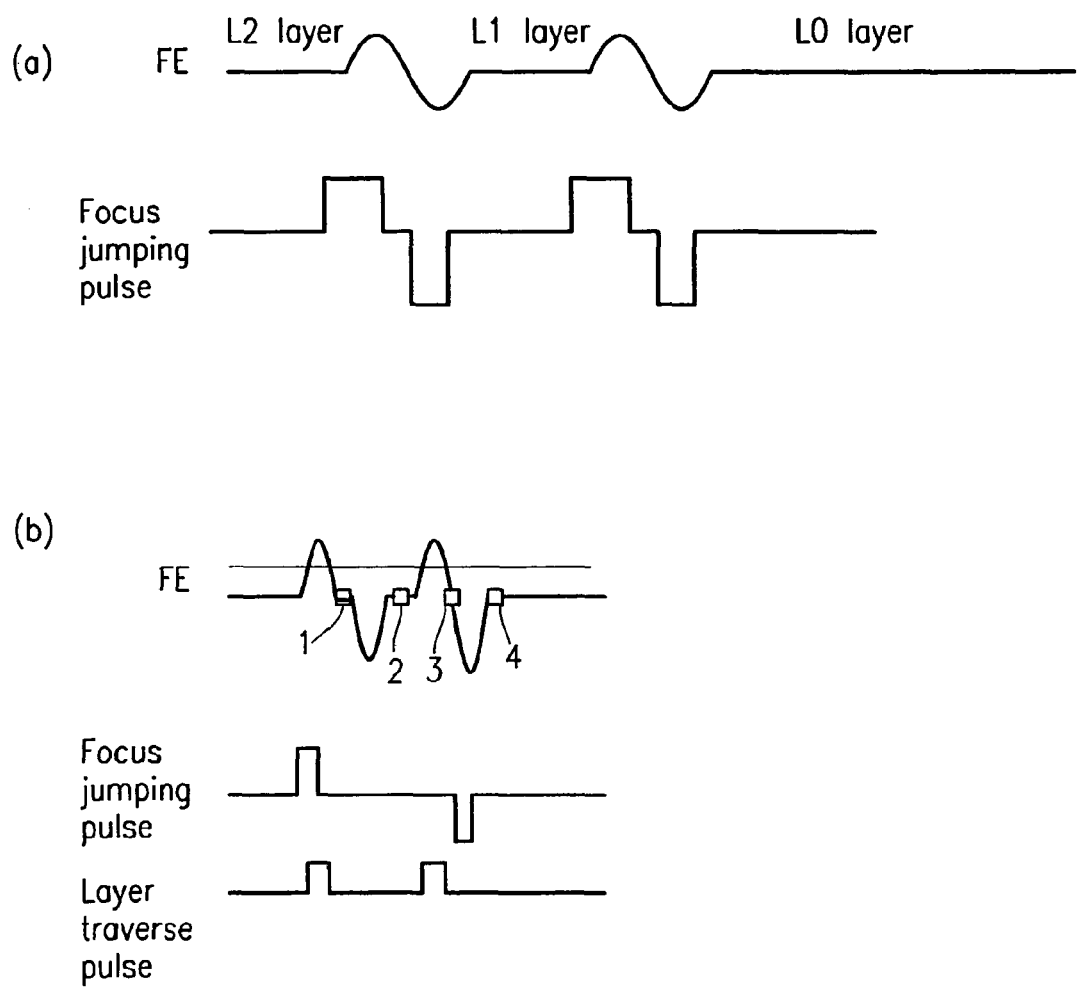
FIG. 5($a$) shows a focus-jumping pulse having a wave-height value and a pulse width appropriate for a movement for every layer.

The focus jumping in a multi-layer disc across the L2 layer to the L0 layer can be applied similarly to the example shown in FIG. 5.

A procedure and a method for reproducing a desired data in a three-layer disc are substantially equivalent to those for recording. Thus, a detailed description is omitted.

Embodiment 5

Figure 10:
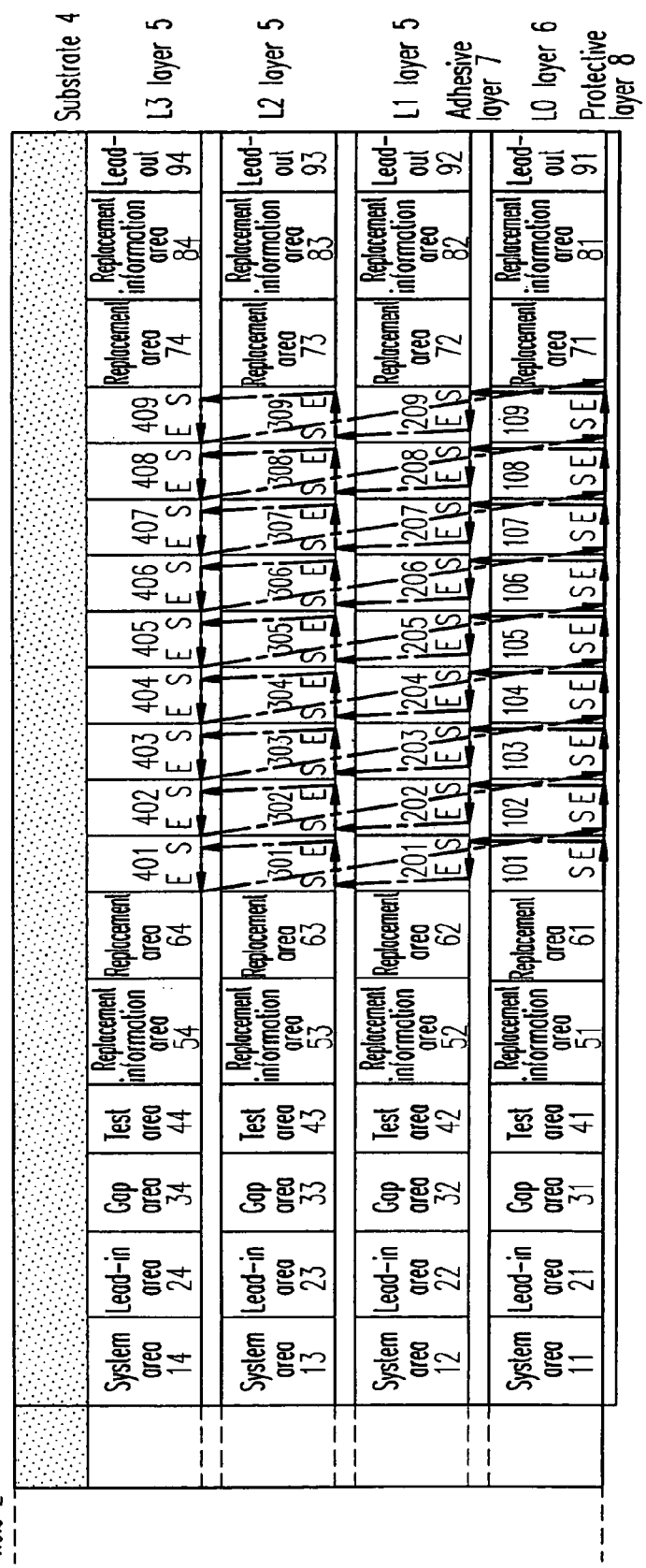
FIG. 10 is a schematic cross-sectional view showing an embodiment of a four-layer disc having four recording layers laminated.

Now, a disc having further increased number of recording layers, for example, a four-layer disc as shown in FIG. 10, will be described.

FIG. 10 shows an embodiment of a four-layer disc having four recording layers laminated. In the four-layer disc, each data zone is allocated with physical addresses incremented along a predetermined direction, and the incremental direction of the physical addresses in the data zones of the first recording layer and the incremental direction of the physical addresses in the data zones of the third recording layer are the same, the incremental direction of the physical addresses in the data zones of the second recording layer and the incremental direction of the physical addresses in the data zones of the fourth recording layer are the same, and the incremental direction of the physical addresses in the data zones of the first recording layer and the incremental direction of the physical addresses in the data zones of the second recording layer are opposite. In other words, in data areas 100, 200, 300, and 400, spiral directions are alternately opposite in each layer. In the present embodiment, the data area 100 of the L0 layer and the data area 300 of the L2 layer has a spiral direction from the inner periphery to the outer periphery, and data area 200 of the L1 layer the data area 400 of the L3 layer has a spiral direction from the outer periphery to the inner periphery.

For better understanding, regarding a procedure and a method for recording data in these data areas, continuous recording of long-duration motion pictures will be described. In FIG. 10, an optical beam spot is located at track 101S, which is a substantial head portion of the data area 101 of the L0 layer of the optical disc. When recording is performed for the first time, the recording is started from this head track 101S. Tracks basically form a spiral structure, and as the optical beam spot scans a track, the information is sequentially recorded from track S to track E, from the inner periphery toward the outer periphery of the disc. When the recording reaches a substantial end track E of the zone 101, it is temporarily switched to a reproduction mode, and focus jump is performed. The optical beam spot is moved to a zone 201 of an L1 layer and then seeks the substantial start track 201S of the zone 201 to resume recording.

A method of focus jump is performed as follows. When a command is received by the operational core 517 from the host 527 or the controller 528 similarly to an instruction for search, i.e., when an optical beam reaches the last address of the data zone by a spiral operation, the switch 530 is switched from connection of A and C to connection of B and C. The focus control is released. A predetermined acceleration pulse and a deceleration pulse are applied to the focus control element via the switch 530, the DA converter 520, and the 2-channel driving circuit 533 from the pulse generation section 529. Thus, the focus jump is performed. Specific control methods, such as generation of the acceleration/deceleration pulse, or timing is not directly related to the present invention, and can be structured similarly as in the conventional technique. Thus, the detailed explanation is omitted herein.

Opposite to the L0 layer, tracks of the L1 layer which position above the L0 layer form a spiral structure running from the outer periphery to the inner periphery. As the optical beam spot scans the track, information is sequentially recorded from track 201S on the outside of the disc to track 201E.

When the recording reaches the substantial end track 201E of the zone 201, it is temporarily switched to the reproduction mode. The optical beam spot is moved to a zone 301 of the L2 layer which locates further above. Similar to the L0 layer, the L2 layer has a spiral structure running from the inner periphery to the outer periphery. A seek for the substantial start track 301S of the zone 301 is performed and then the recording is resumed. As the optical beam spot scans the tracks, data are sequentially recorded from the track 301S of the inside of the disc to the track 301E.

When the recording reaches the substantial end track 301E of the zone 301, it is temporarily switched to the reproduction mode. The optical beam spot is moved to the zone 401 of the L3 layer positioned further above. Similar to the L1 layer, the L3 layer has a spiral structure running from the outer periphery to the inner periphery. A seek for the substantial start track 401S of the zone 401 is performed and then the recording is resumed. As the optical beam spot scans the tracks, data are sequentially recorded from the track 401S of the outside of the disc to the track 401E.

When the recording reaches the substantial end track 401E of the zone 401, it is temporarily switched to the reproduction mode. Focus jumping is performed in a reverse direction (downward direction in FIG. 10) to move the optical beam from the L3 layer to the L0 layer, passing through the L2 and L1 layers. Then the optical beam spot is moved to start track 102S of a zone 102 located in substantially the same radius. Then, the recording is resumed from the substantial start track 102S of the zone 102. A similar process is continued until the recording of the data to be recorded is finished. Data is sequentially recorded from the zones 101, 201, 301, 401, 102, 202, 302, 402, 103, 203 . . . , 409.

The focus jumping in a multi-layer disc across the L3 layer to the L0 layer can be performed similarly as in the example shown in FIG. 5.

A procedure and a method for reproducing a desired data in this four-layer disc are substantially equivalent to those for recording when reproduction is performed continuously. Thus, a detailed description is omitted.

Figure 11:
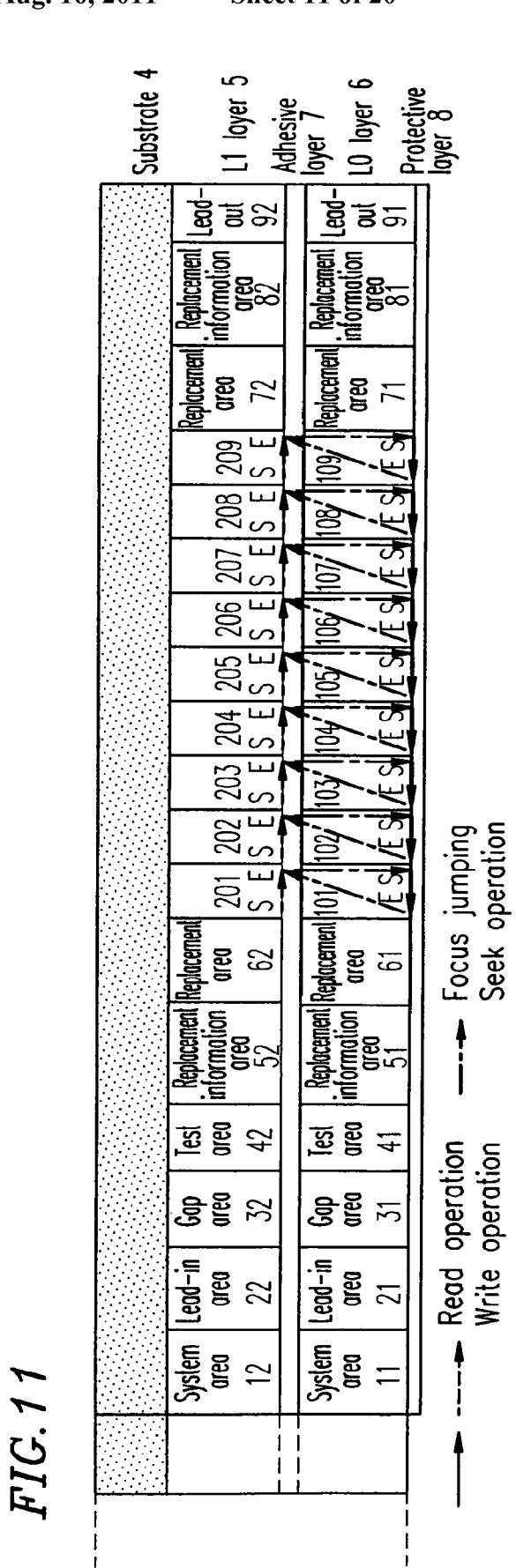
FIG. 11 is a schematic cross-sectional view illustrating a method for recording/reproducing information on/from the layer closest to a substrate (L1 layer) in a double-layer disc (opposite-path type)

Embodiment 5 has been described with respect to an operation in the case where the directions of spirals are: from the inner periphery to the outer periphery in the L0 layer; from the outer periphery to the inner periphery in the L1 layer; from the inner periphery to the outer periphery in the L2 layer; and the outer periphery to the inner periphery in the L3 layer, respectively. However, the directions of spirals may be: from the outer periphery to the inner periphery in the L0 layer; from the inner periphery to the outer periphery in the L1 layer; from the outer periphery to the inner periphery in the L2 layer; and the inner periphery to the outer periphery in the L3 layer, respectively. Further, the present embodiment is structured such that recording/reproduction is started from the outermost (the furthest from the substrate) zone 101 of the L0 layer. However, the present invention is not limited to this. The recording/reproduction may be started from the head zone of the data area located in the innermost (the closest to the substrate) layer, i.e., the L1 in the double-layer disc as shown in FIG. 11, the L2 in the three-layer disc, and the L3 in fourth-layer disc.

Embodiment 6

FIG. 12(*a*) is a schematic cross-sectional view of a structure of an optical disc according to Embodiment 6. FIG. 12(*b*) is a schematic cross-sectional view illustrating a method (a direction and an order) for recording/reproducing information on/from the optical disc. Embodiment 6 can be implemented with a structure similar to that shown in FIG. 3 by only alternating μ codes of the DSP 513 and the host 527 or a sequence process of software. In Embodiment 6, the spiral directions of the L0 layer and the L1 layer are the same (from the inner periphery to the outer periphery of the disc). A procedure and a method for recording desired data in a data area of a disc in this case will be described. For better understanding of the present invention, similar to the above embodiments, continuous recording of long-duration motion pictures will be described.

As shown in FIG. 12(*a*), an optical disc according to Embodiment 6 comprises an L0 layer and an L1 layer. The layouts of the L0 layer and the L1 layer are slightly different from each other. An objective, a function, and a role of each of the areas are basically the same.

A disc of the present embodiment has a substrate 4 of a resin and/or a glass and two recording layers, i.e., an L1 layer 5 and an L0 layer 6, laminated thereto via an adhesive layer 7. Both the L0 layer 6 and the L1 layer 5 have information surfaces on the sides further from the substrate. The L0 layer 6 is set to be about 80 μm and the adhesive layer 7 is set to be about 20 μm. Thus, a distance between a disc surface and the information surface of the L1 layer is about 100 μm. If the disc has three or four recording layers, an information surface of an L2 layer locates at a distance of about 120 µm from the disc surface, and an information surface of an L3 layer is located at a distance about 140 µm from the disc surface. In the present embodiment, the number of the layers is not a defining feature. Thus, an example of a double-layer disc will be described.

In the L0 layer and the L1 layer, there are clamp areas 3 in the innermost periphery. Next to the clamp areas 3, bar code areas (system areas) 11 and 12, lead-in areas 21 and 22, gap areas 31 and 32, test areas 41 and 42, replacement information areas 51 and 52, replacement areas 61 and 62 are respectively located in inner system areas 120 and 121. Replacement areas 71 and 72, replacement information areas 81 and 82, lead-out areas 91 and 92 are respectively located in outer system areas 124 and 125. Data areas 122 and 123 are respectively between the inner system areas 120 and 121 and the outer system areas 124 and 125.

The data areas 122 and 123 to and from which user data is recorded/reproduced are separated in predetermined periods in a radial direction. The L0 layer includes data zones 102 to 108 and the L1 layer includes data zones 201 to 209 (in the present embodiment, the L0 layer has seven zones and the L1 layer has nine zones, for convenience of the explanation. However, the present invention is not limited to this, and any number of data zones is possible). The rate is switched for each zone. The data is recorded with substantially stable linear speed (or linear density).

In particular, the L0 layer has the same thickness as the recording layer of a single-layer disc (i.e., a distance from a surface is the same). The L0 layer is allocated with focusing zones 151 and 152 for performing focus control during starting up in the inner and the outer peripheries. Thus, the L0 layer has seven zones in total. The L1 layer does not have a focusing zone. Portions corresponding to the positions thereof are data areas (zone 201 and 209). Apart from these portions, the structure of the L1 layer is the same as the L0 layer. Data areas for recording/reproducing data are separated into zones with a predetermined interval in a radial direction. The rate is switched for each zone. The data is recorded with substantially stable linear speed (or linear density).

In Embodiment 6, when an apparatus is powered on, an optical beam moves to the inner periphery side focusing zone 151 or the outer periphery side focusing zone 152 by a traverse motor 532. The disc is rotated with a predetermined rate by a spindle motor. A focus control element 510 is moved to become closer or further to the disc and a focus error is detected. The optical beam is focused on the L0 layer which is closer to a convergence lens. If the spherical aberration of the optical beam is corrected to match the thickness of the L0 layer, i.e., 85 µm, qualities of the focus error signal and the tracking error signal is secured because the L0 layer has the same thickness, i.e., 80 µm, in any of single-layer, double-layer, and multi-layer discs at least in an initial state. Thus, it is possible to perform focus control and track control stably. Even if focusing fails due to an external vibration or shock, the optical disc 501 and the converging lens 506 collides, and a disc surface receives a scratch, it does not cause a problem because the focusing area has only address data and control codes or user data is not recorded therein. After the tracking control is performed, if a required learning of off-set or gain or the like is performed by recording a dummy RF signal or the like for adjustment, an RF signal can be detected stably. Thus, an address extraction circuit 524 extracts address information on tracks and recognizes a track currently being scanned by the optical beam. Then, a predetermined track of lead-in areas 21 or 22 in which control information on the type of the disc or book type is stored is accessed. When the predetermined lead-in information is obtained, it becomes a stand-by state in which recording/reproduction of actual information can be started and starting up is completed. As described above, by using the focusing zone as the learning zone, a stable start-up can be secured. If a disc having the focusing zone is fabricated and examined as a standard with respect to variations in film or substrate thicknesses or tilts, optimal learning can be performed with this specific portion as a center. Thus, a recording/reproduction margin can be expanded.

In the above description, tracking control is turned on in a focusing zone, address information is obtained in the focusing zone and a desirable track is accessed. Alternatively, after focusing control, a traverse motor 532 may be driven without performing tracking control, the move to a region near the zone where a desired track is located. The tracking control may be turned on to obtain address information to access a near desirable track.

In Embodiment 6, data is continuously recorded for every two zones (or a data zone group including a predetermined number of data zones set before recording) in one layer. Thus, the number of times to perform focus jumping in continuous recording is small. Thus, the probability of collision of the objective lens to the disc can be reduced. This operation is described with reference to FIG. 12(b). The recording of information is performed for each data zone group in an order, such as, zones 201 to 202, zones 102 to 103, zones 203 to 204, and so on. For example, for recording a big motion-picture file, the optical beam is first moved to a head track S of the zone 201 of the L1 layer. Then, the optical beam scans a track along a spiral direction toward the end track E of the zone 201 with sequentially recording data. When recording of data of an amount corresponding to one zone is completed, recoding is continued in the adjacent zone 202 in the same L1 layer across the border of the zones. When it reaches the end track E of the zone 202 and recording of the data of an amount corresponding to two zones is completed, the optical beam spot is moved from the L1 layer to the L0 layer by focus jumping, and accesses to the head track S of the zone 102.

Similarly, the optical beam scans a track along a spiral direction toward the end track E of the zone 102 to record data sequentially. As in the L1 layer, when recording of the data of an amount corresponding to one zone is completed, recording is continued in the zone 103 in the same L0 layer, across the border of the zone. When the optical beam reaches the end track E of the zone 103 and the recording of the data of an amount corresponding to two zones is completed, the optical beam spot is moved from the L0 layer to the L1 layer by focus jumping again. The head track S of the zone 203 is accessed, and data is sequentially recorded similarly. The above procedure is repeated until the recording of a designated file size is completed. In FIG. 12(b), the above-described movements of the optical beam spot is indicated by an arrow.

It is desirable that, regarding the physical address for access, an order of the zones to which the optical beam move matches the incremental direction of the physical addresses. If they do not match, a head address of each zone may be stored and managed by a system. If physical addresses are simply allocated, for example, from the inner periphery to the outer periphery (or from the outer periphery to the inner periphery) in an ascending order from L0 for each layer, so as to match an order and a direction of zones to which physical addresses are recorded including a replacement process for defects or the like, a structure of a disc can be simplified. Further, an arrangement of the physical addresses is switched in accordance of the utility. If the information regarding this is recorded in a management region which forms a part of a replacement area, recording can be performed efficiently for various utilities.

As described above, in a disc according to Embodiment 6, focusing zones are located in the inner periphery and the outer periphery of the L0 layer. During starting up or restarting, the optical beam spot is moved to the focusing zone, and focusing is performed. Since data is not recorded in these regions, even if focusing fails, the lens collides into an optical disc, and the L0 layer is damaged, recording/reproduction of information of the L1 layer which resides further inside the disc are secured.

In the above description of Embodiment 6, data is recorded in a data zone group unit into two continuous zones of the L0 layer and the L1 layer. However, the present embodiment can be applied to the case where zones are continuously switched within a permissible range of responsibility of rotation switching of a spindle motor and recordability free of jitter (for example, every three zones or every four zones). The probability of data damage due to focusing or focus jumping can be significantly reduced.

Figure 13:
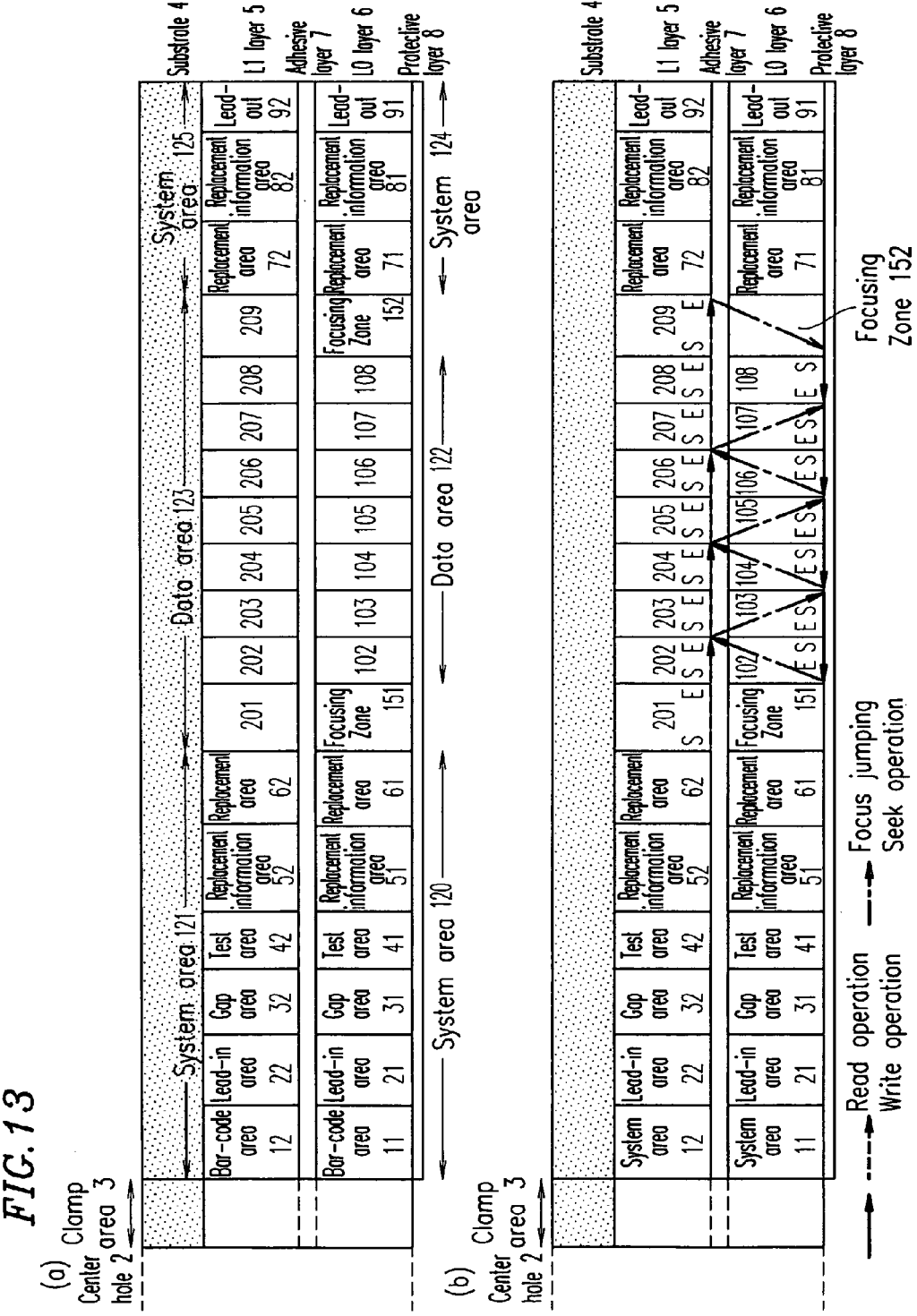
FIG. 13($a$) is a schematic cross-sectional view of an optical disc having a double-layer structure (opposite-path type) according to Embodiment 6.

As shown in FIG. 13(a), Embodiment 6 can be applied to an opposite path type disc having the L0 layer and the L1 layer of opposite directions, such as a spiral direction from the outer periphery to the inner periphery of the disc for the L0 layer, and a spiral direction from the inner periphery to the outer periphery for the L1 layer. As shown in FIG. 13(b) with an arrow, for recording/reproducing desired data on/from a data area of the disc, access including a spiral operation across a plurality of zones (data zone group) in the same layer and focus jumping is performed.

Embodiment 7

Figure 14:
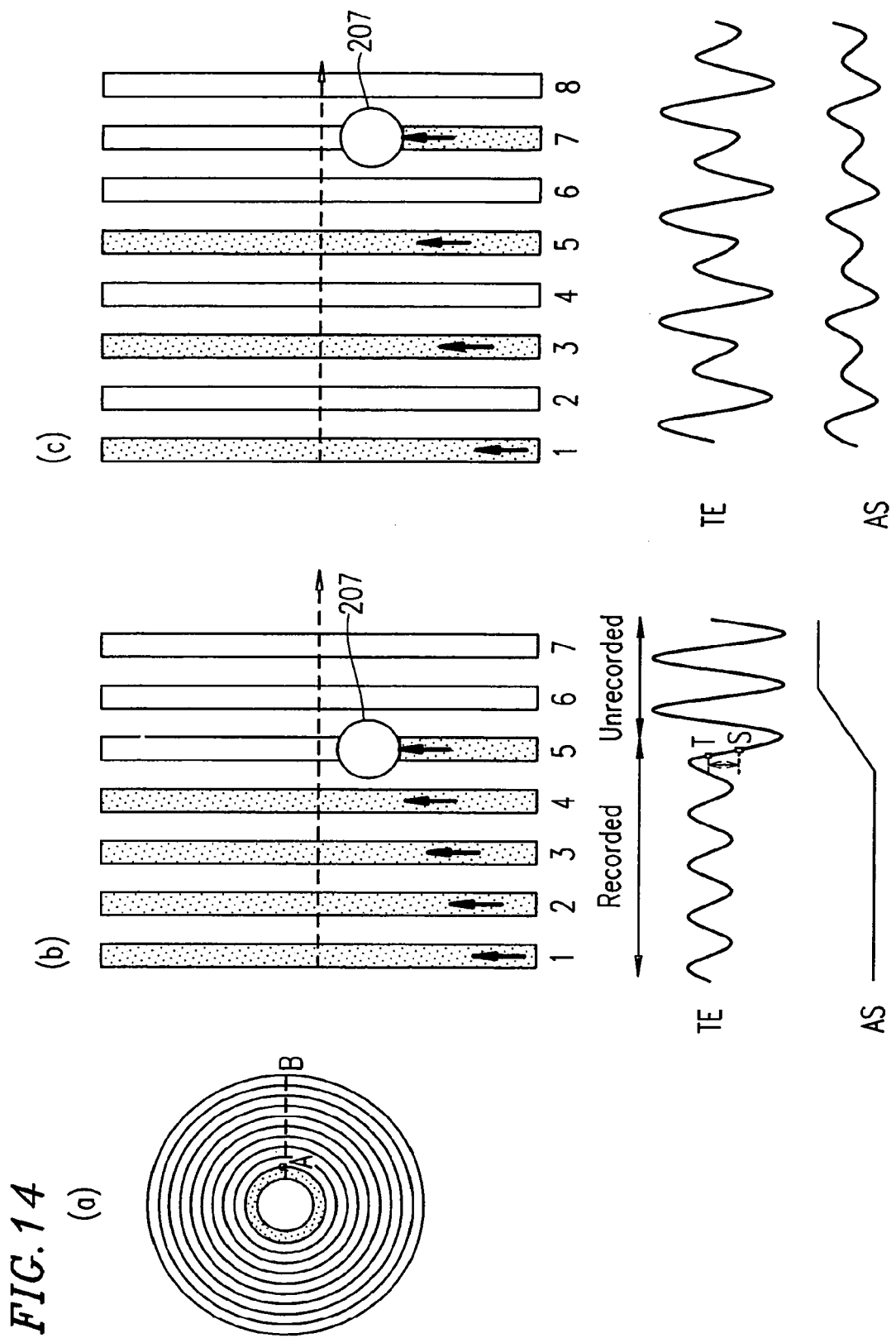
FIG. 14($a$) is a plan view schematically showing a structure of an optical disc.

FIG. 14(a) is a plan view schematically showing a structure of an optical disc. FIG. 14(b) shows a partial enlarged view of tracks of an optical disc being recorded according to a conventional technique and waveforms of a tracking error signal (TE) and total reflection signal (AS) in such a case. FIG. 14(c) shows a partial enlarged view of tracks of an optical disc according to Embodiment 7 of the present invention and waveforms of a tracking error signal (TE) and AS in such a case.

The tracks of the conventional optical disc have one spiral. When the data is continuously recorded in these tracks, For example, recording sequentially proceeds along the spiral to the adjacent tracks, for example, from track 1 on the inner periphery side to tracks 1, 2, 3, and so on. When continuous recording is performed in such a structure, the adjacent track of the inner periphery side relative to the position of the beam spot is recorded and the adjacent track of the outer periphery side is unrecorded. Thus, the amounts of reflected light are different from each other. Conventionally, in a method for detecting a tracking deviation from intensities of primary diffraction light of track grooves, such as push-pull tracking, an influence of a difference in reflectances between the adjacent tracks on both sides was small. As a density becomes higher and a track pitch becomes smaller, a relative spot diameter of an optical beam with respect to tracks on the disc becomes larger. Thus, the influence due to a difference in reflectances of both adjacent tracks is caused. As shown in FIG. 14(b), when the optical beam is scanning the border between recorded and unrecorded regions, the left side of the optical beam is a recorded side and the right side of the optical beam is an unrecorded side. Thus, offset (TS range indicated by arrow in the figure of TE waveform in FIG. 14(b)) is generated in one-sided tracking signal. Thus, tracking tends to be out of control during recording and sounds tend to skip when the beginning of a music piece is being searched or when the reproduction of a music piece comes to the end.

Figure 15:
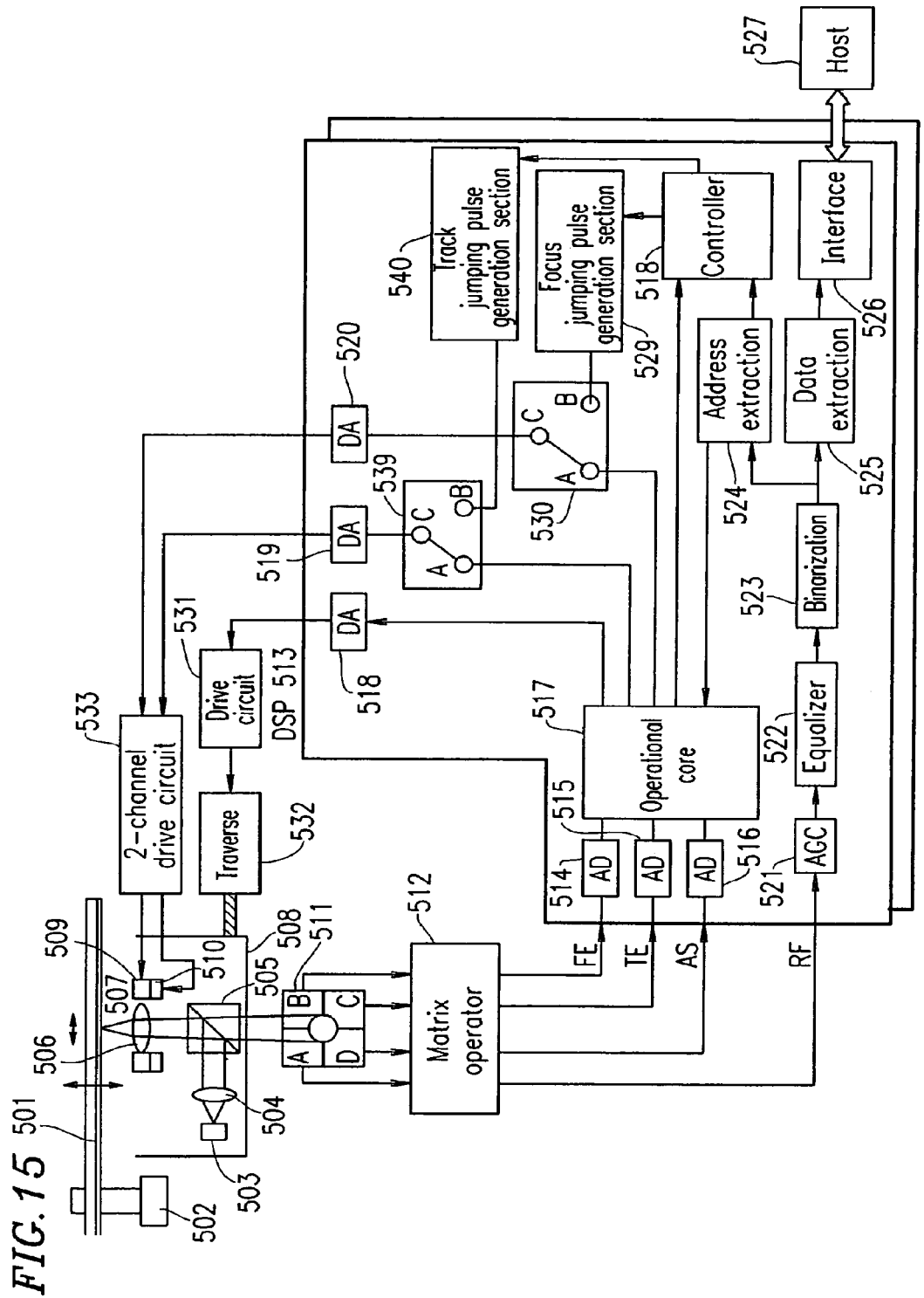
FIG. 15 is a block diagram showing another structure of an apparatus for recording/reproducing information on/from the optical disc of the present invention.

Embodiment 7 can be implemented with a structure similar to that shown in FIG. 3 by only alternating μ codes of the DSP 513 and the host 527 or a sequence process of software. FIG. 15 is a block diagram showing structure of an information recording/reproduction apparatus. In Embodiment 7, both the single-layer disc and the multi-layer disc having two or more layers can be applied. For better understanding, the case using the single-layer disc will be described.

When data of a predetermined file size is recorded in an unrecorded disc, laser is pulse-modulated with a recording power. The generated heat causes a phase change in a recording layer, thereby forming a mark. Usually, recording layer is in a crystal state when it is unrecorded. When a laser of a recording power is applied to the recording layer, a phase change occurs in the recording layer in a crystal state, and the recording layer is transformed into an amorphous state, and thus a mark is formed. The mark is reproduced by applying a laser at a reproducing power to the mark and detecting a change in a reflectance. Since an unrecorded track and a recorded track (dot meshed portion in FIG. 14(b)) have different average amounts of reflection, as shown in FIG. 14(b), amplifications of a tracking error signal (TE) and total reflection signal (AS) of a servo band are changed in the portion corresponding to the recorded tracks. In the track 5, i.e., a border of recorded and unrecorded portions, symmetry of TE is badly affected by a difference in reflectances of the both adjacent tracks. Specifically, midpoint S of the waveform of a TE signal shown in FIG. 14(b) should beat the center of track, but, actually, point T is tracked and a tracking range of one side becomes smaller.

For performing continuous recording in Embodiment 7, when a conventional one-spiral disc is used, a position after one rotation is detected in a zero sector or a Z phase of FG of a spindle, and track jumping is performed for every other track in synchronization with the detected signal to record data in every other track. When a disc having concentric circle tracks as shown in FIG. 14(a) is used, a position after one rotation is also detected in a zero sector or a Z phase of FG of a spindle, and track jumping is performed for every other track in synchronization with the detected signal to record data in every other track. The operation will be described with reference to a block diagram shown in FIG. 15. From the address extraction circuit 524, a timing of jumping is generated at a controller 518. A jumping pulse generated at a track jump pulse generation section 540 is output to a tracking control element 509 via a switch 539, a DA 519, and a 2-channel driving circuit 533. After data is recorded in one track, one adjacent track is skipped and an operation of resuming recording is performed. FIG. 16(a) is a plan view of an optical disc being recorded. FIG. 16(b) shows a partial enlarged view of tracks when recording is performed in every other track and a TE waveform and a jumping waveform.

When tracks having two spirals which are independent from each other as in a land-groove recording type disc are used, data is recorded in first one spiral track A by spiral scanning. Next, data is recorded in other spiral track B by spiral scanning. As described above, if data are separately recorded in two tracks, when recording of an unrecorded disc is performed, both adjacent tracks are always unrecorded at recording of the spiral track A, and both adjacent tracks are always recorded at recording of the spiral track B. Thus, there is no difference in reflectances between the adjacent tracks at the inner and the outer sides of the beam spot. Thus, the offset variation of a tracking signal can be prevented. Similarly, for reproducing data, adjacent tracks are in the same state. Thus, stable recording and reproducing operations can be implemented.

Furthermore, using the advantage of recording in every other track, for example, audio or video information is recorded in even-numbered tracks (or odd-numbered tracks), and code data for PC is recorded in odd-numbered tracks (or even-numbered tracks), management of file and data can be facilitated and capacity or the like of a program can be reduced.

Embodiment 8

Figure 17:
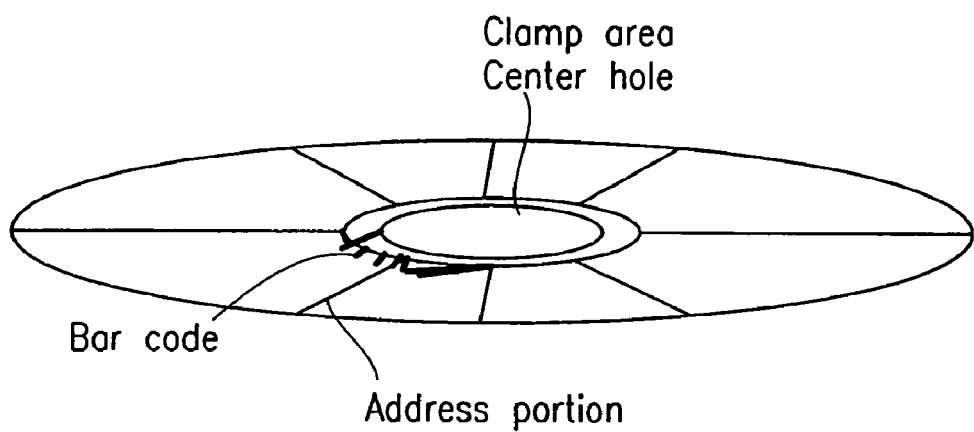
FIG. 17 is a plan view showing a concept of the optical disc of Embodiment 5 of the present invention.

FIG. 17 is a plan view showing a concept of an optical disc according to Embodiment 5 of the present invention. Embodiment 8 shows an example of an optimal disc layout in each layer of an optical disc having a multi-layer structure. As shown FIG. 17, disc individual information (control information which is not required to be rewritten or added, such as, number of layers, capacity, track pitch, types of ROM/RAM) may be recorded in a lead-in area of the first layer or in a black bar code (hereinafter, referred to as BBC) on a disc surface. Alternatively, the information may be recorded by making a specific region of a recording film transparent intentionally and peeling an aluminum film under the recording layer by a burst-like laser (hereinafter, referred to as BCA). During the initial starting up, optical beam is focused on a disc surface or the lowest L0 layer (the closest layer to a light source). The disc individual information is read, recording/reproduction conditions and servo conditions are decided. Then, a predetermined starting up process proceeds so that the disc is in a recordable/reproducible state. Also, an address of a defect portion found during the recording and/or location pattern of physical information is located in the L0 layer.

Areas for record learning and learning areas for focus positions having different properties for each disc are provided on each of the layers. Thus, lead-in areas and replacement area can be omitted from the recording layers other than the L0 layer to increase the total user capacity of the disc.

Figure 18:
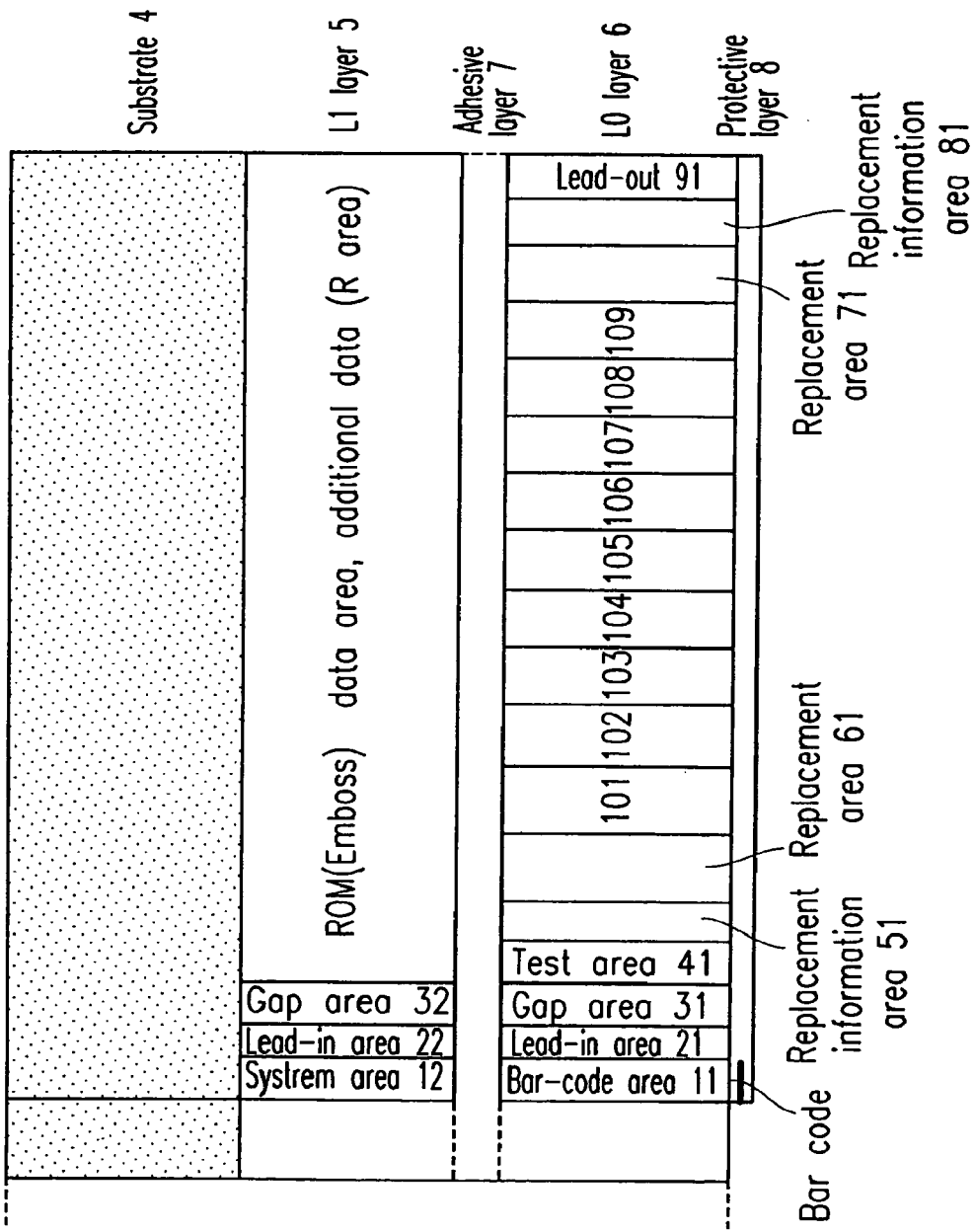
FIG. 18 shows an example of a structure of a partial double-layer ROM.

FIG. 18 shows an example of a structure of a partial double-layer ROM. In FIG. 18, the second layer from the light source of the optical beam (further layer) is a read-only ROM layer formed by emboss-pitting an aluminum film or a write-once (R) layer having a high reflectance and the first layer is a recordable RAM layer. Software which is a source of a game or application is recorded in the second layer, a ROM layer or an R layer, and distributed while the update information or user information is recorded in the first layer, a RAM layer. By making the second layer (further layer) a ROM layer, the reflectance of the first layer, the RAM layer, increases, and thus, S/N can be readily maintained. Further, for performing pre-write operation, an apparatus and a head portion managed in a fabrication and examination process of a disc is used. Thus, it is preferable to make the second layer the ROM layer from an aspect of a reliability.

In the case of a multi-layer disc, there is a limit in an accuracy in adhering the recording layers. Thus, address portions or zone boundaries between the first layer and the second layer cannot be accurately matched. This may be used for implementing a system which can protect the copyright and prevent pirated copies.

FIG. 19 is a timing chart for illustrating a copyright protection process. In FIG. 19, address positions and address information signals of the L0 layer and the L1 layer are shown. As shown in FIG. 19, focus control is performed to the first layer (L0 layer). Having positions of the address portions of the first layer (L0 layer) obtained by synchronizing with PLL as a standard, positions T of address portions of the second layer (L1 layer) which can be read by inter-layer cross-talk are measured by a read clock or a timer. The measured values are written into the BCA.

FIG. 20 is a flowchart for illustrating copyright protection process. When the start-up of the apparatus is performed, focusing to a disc surface is turned on (step 1). Next, BBC (or BCA) on a disc surface is read (step 2). Copyright information of a loaded disc is determined (step 3). When a copy is prevented by a copyright, registered protection information (clock information or time information) from the address position of the first layer (L0 layer) to the address position of the second layer (L1 layer), i.e., the registered information to be protected, is read (step 4). Next, focusing and tracking to the first layer (L0 layer) is actually performed (step 5). At a state where the actual address of the first layer (L0 layer) becomes able to be reproduced, the cross-talk address of the second layer (L1 layer) is recognized and the clock difference (or time difference) of the position is measured (step 6). The measured value in step 6 is compared with the registered information read from the BBC (step 7). If the comparison result is within a predetermined range, the contents are made available for reproduction (step 8). If not, the reproduction is judged to be inappropriate and stopped (step 9).

Even if a stamper or a cutting can be copied from the disc substrate, it is quite difficult or impossible to match the adhesion positions in a few clock units. Thus, even if the BBC (or BCA) is imitated, the registered information and the actual measure information are different. Accordingly, the contents cannot be reproduced. With the above-described method, protection of copyrights and appropriate reproduction can be readily performed.

The structure of the optical disc in the present embodiment can be applied to a multi-layer disc having an arbitrary number of layers.

INDUSTRIAL APPLICABILITY

According to the present invention, it is possible to perform efficient recording/reproduction regardless of a capacity of a file, and also record/reproduce data in a seamless manner while maintaining an ability to allow a random access.

Furthermore, by recording information in every other track, an influence caused by a difference between reflectances due to recorded/unrecorded states of adjacent tracks can be reduced. As a result, it becomes possible to implement a stable tracking control and to provide an apparatus of a high reliability.

Further, by locating a ROM region in the furthest layer from a light-source, it becomes possible to implement a partial ROM disc more easily and to provide a high-performance apparatus which is capable of performing recording and reproduction with ROM region and RAM region switched at a high-speed to easily implement high-speed writing of additional data and recording of a program different to the one being viewed.

According to the optical disc, and a method and an apparatus for recording/reproducing information on/from the optical disc of the present invention, the disc is less subject to rotation variation during recording, and the number of focus jumps can be reduced as much as possible. Thus, the probability of collision of the lens and the disc can be reduced. Furthermore, the optical disc, and a method and an apparatus for recording/reproducing information on/from the optical disc of the present invention can be applied to a wide variety of utilities and provides a disc format which can readily protect copyrights and allows applications to be made.

Accordingly, the present invention can be applied to a record/reproduction apparatus of a large capacity using a laser of a shortwave, which is assumed to be used in the future, and the effect thereof is significant.

The invention claimed is:

1. An apparatus for recording/reproducing information on/from an optical disc, wherein the optical disc has a first to an n-th recording layers (n is an integer of 2 or greater) laminated on a substrate, each of the first to the n-th recording layers having data regions segmented into a first to an m-th data zone groups (m is an integer of 2 or greater) along a radial direction of the optical disc, each of the first to the m-th data zone groups including at least one data zone, physical address is assigned to increase along a predetermined direction within the data zones, the direction increasing the physical address within the data zones of the n-th recording layer is opposite to the direction increasing the physical address within the data zone of the n−1-th recording layer which is adjacent to the n-th recording layer, and an end track of a j-th data zone group (j=1, 2, . . . , m) of the n-th recording layer and a start track of a j-th data zone group of the n−1-th recording layer adjacent the n-th recording layer are vertically aligned, the apparatus comprising:

light receiving means for receiving an optical beam reflected off the optical disc;

shift means for shifting a position of a focal point of the optical beam along a direction of lamination of the first to the n-th recording layers of the optical disc; and control means for performing a focus control, by means of controlling the shift means according to the output of the light receiving means, such that the distance between the focal point of the optical beam and a recording layer selected among the first to the n-th recording layers is within a predetermined error range, the control means releasing the focus control and controlling the shift means such that the focal point of the optical beam jumps from the end track of the j-th data zone group (j=1, 2, . . . , m) of the selected recording layer to a position adjacent the start track of the j-th data zone group of the recording layer adjacent to the selected recording layer, wherein the shift means is controlled such that the position of the focus point of the light beam reaches the recording layer selected from the first to the nth recording layers within a predetermined error range in radial direction.

2. An apparatus according to claim 1, wherein for the optical disc, among the recording layers, a recording layer which is closest to the substrate is the first layer, and recording layer which is furthest to the substrate is the n-th layer; and in the first layer or the n-th layer, a focusing zone is provided, and a physical address is assigned in the direction of increasing from the closest portion of the focusing zone to the data zone; and for the apparatus, a focus control means is further provided to perform focus control within the focusing zone to select the first recording layer or the n-th recording layer by means of controlling the shift means in accordance with the output of the light receiving means when operating the apparatus.

* * * * *